US012634135B2

(12) United States Patent
Jakobsson et al.

(10) Patent No.: US 12,634,135 B2
(45) Date of Patent: May 19, 2026

(54) SYSTEMS AND METHODS FOR BLOCKCHAIN-BASED CONTENT CO-CREATION

(71) Applicant: Artema Labs, Inc, Los Angeles, CA (US)

(72) Inventors: Bjorn Markus Jakobsson, New York, NY (US); Sukamol Srikwan Jakobsson, New York, NY (US); Stephen C. Gerber, Austin, TX (US); David Agnew, Los Angeles, CA (US); Madhu Vijayan, Venice, CA (US); Keir Finlow-Bates, Eura (FI)

(73) Assignee: Artema Labs, Inc, Los Angeles, CA (US)

( * ) Notice: Subject to any disclaimer, the term of this patent is extended or adjusted under 35 U.S.C. 154(b) by 459 days.

(21) Appl. No.: 18/045,400

(22) Filed: Oct. 10, 2022

(65) Prior Publication Data

US 2023/0114684 A1 Apr. 13, 2023

Related U.S. Application Data

(60) Provisional application No. 63/282,923, filed on Nov. 24, 2021, provisional application No. 63/254,062, filed on Oct. 9, 2021.

(51) Int. Cl.
*H04L 9/32* (2006.01)

(52) U.S. Cl.
CPC .......... *H04L 9/3213* (2013.01); *H04L 9/3247* (2013.01)

(58) Field of Classification Search
CPC ... H04L 9/3213; H04L 9/3247; H04L 9/3268; H04L 9/3271; H04L 9/50
See application file for complete search history.

(56) References Cited

U.S. PATENT DOCUMENTS

| | | |
|---|---|---|
| 5,913,061 A | 6/1999 | Gupta et al. |
| 9,532,246 B2 | 12/2016 | Michl et al. |

(Continued)

FOREIGN PATENT DOCUMENTS

| | | |
|---|---|---|
| WO | 2016065153 A2 | 4/2016 |
| WO | 2021046552 A1 | 3/2021 |

OTHER PUBLICATIONS

Alkadi et al. "A Review of Intrusion Detection and Blockchain Applications in the Cloud: Approaches, Challenges and Solutions", IEEE Access, vol. 8, Jun. 3, 2020, pp. 104893-104917, doi:10.1109/ACCESS.2020.2999715.

(Continued)

*Primary Examiner* — Theodore C Parsons
(74) *Attorney, Agent, or Firm* — KPPB LLP

(57) ABSTRACT

In various embodiments, a device can be configured to evolve in response to a token evolution, the token recorded on a distributed ledger. The device can include an output device, memory, and a processor. The processor configured to receive an identifier and a first authenticator value associated with a token. The processor further configured to determine a state associated with the token, and receive a signal. The signal including a second authenticator value. The processor further configured to determine whether the second authenticator value matches a third authenticator value. The processor further configured to generate a transaction record when the second authenticator value matches the third authenticator value and the second authenticator value satisfies the condition. The processor further configured to transmit the transaction record. The transaction record capable of being used to compute a challenge for securely adding the transaction record to a distributed ledger using a cryptographic system.

20 Claims, 28 Drawing Sheets

(56) References Cited

U.S. PATENT DOCUMENTS

| | | | |
|---|---|---|---|
| 10,946,283 B1 | 3/2021 | Meilich et al. | |
| 11,367,060 B1 | 6/2022 | Barbashin et al. | |
| 11,526,614 B2 | 12/2022 | Fang | |
| 2007/0022196 A1* | 1/2007 | Agrawal | H04L 63/0815 |
| | | | 709/225 |
| 2014/0164251 A1 | 6/2014 | Loh | |
| 2015/0172392 A1 | 6/2015 | Jean et al. | |
| 2015/0237065 A1 | 8/2015 | Roytman et al. | |
| 2016/0062821 A1 | 3/2016 | Yoon et al. | |
| 2017/0116693 A1 | 4/2017 | Rae et al. | |
| 2018/0025157 A1 | 1/2018 | Titonis et al. | |
| 2018/0068091 A1* | 3/2018 | Gaidar | G06F 21/16 |
| 2018/0115425 A1 | 4/2018 | Dechu et al. | |
| 2018/0278596 A1 | 9/2018 | Ateniese et al. | |
| 2019/0229915 A1 | 7/2019 | Digiambattista et al. | |
| 2020/0118123 A1 | 4/2020 | Liu et al. | |
| 2020/0142693 A1 | 5/2020 | Neugschwandtner et al. | |
| 2020/0273048 A1 | 8/2020 | Andon et al. | |
| 2020/0285633 A1 | 9/2020 | Zhuo et al. | |
| 2020/0311698 A1 | 10/2020 | Gardner et al. | |
| 2020/0327044 A1 | 10/2020 | Pi et al. | |
| 2020/0349054 A1 | 11/2020 | Dai et al. | |
| 2021/0035246 A1 | 2/2021 | Schouppe et al. | |
| 2021/0049281 A1 | 2/2021 | Braghin et al. | |
| 2021/0073286 A1 | 3/2021 | Hunter | |
| 2021/0082044 A1* | 3/2021 | Sliwka | H04L 9/3255 |
| 2021/0165822 A1* | 6/2021 | Blackburn | G06V 20/52 |
| 2021/0241273 A1 | 8/2021 | Abad et al. | |
| 2021/0248214 A1 | 8/2021 | Goldston et al. | |
| 2022/0012367 A1 | 1/2022 | Ramanan et al. | |
| 2022/0108232 A1 | 4/2022 | Hardgrave et al. | |
| 2022/0138640 A1 | 5/2022 | Augustine et al. | |
| 2022/0179626 A1 | 6/2022 | Kacherginsky | |
| 2022/0239495 A1 | 7/2022 | Norton et al. | |
| 2022/0391895 A1 | 12/2022 | Weber et al. | |
| 2022/0398340 A1 | 12/2022 | Jakobsson et al. | |
| 2023/0004970 A1 | 1/2023 | Jakobsson et al. | |
| 2023/0070586 A1 | 3/2023 | Kapur et al. | |
| 2023/0073859 A1 | 3/2023 | Matthews et al. | |
| 2023/0100422 A1 | 3/2023 | Jakobsson et al. | |
| 2023/0104103 A1 | 4/2023 | Eby et al. | |
| 2023/0108983 A1 | 4/2023 | Vosseller et al. | |
| 2023/0119641 A1* | 4/2023 | Meyers | H04L 9/50 |
| | | | 463/42 |
| 2023/0120897 A1* | 4/2023 | Kozlowski, III | H04L 9/32 |
| | | | 705/75 |
| 2023/0130182 A1* | 4/2023 | Mir | H04L 9/3247 |
| | | | 713/189 |
| 2023/0169578 A1 | 6/2023 | Krishna et al. | |
| 2023/0261869 A1 | 8/2023 | Russell | |

OTHER PUBLICATIONS

Gao et al. "Physical unclonable functions", Nat Electron 3, 81-91 (2020).

Pappu et al. "Physical One-Way Functions", PHD Thesis, MIT, 2001.

Pappu et al. "Physical One-Way functions", Science. 297 (5589): 2026-2030.

Shamsoshoara et al. "A survey on physical unclonable function (PUF)- based security solutions for Internet of Things", Computer Networks, vol. 183, 2020.

Tuyls et al. "Read-proof hardware from protective coatings", CHES 2006, pp. 369-383.

\* cited by examiner

1700

Obtain a building block token 2502

Obtain token information 2504

Obtain combination request 2506

Transmit combination request 2508

Receive a minted token generated based on combination request 2510

2500

SYSTEMS AND METHODS FOR BLOCKCHAIN-BASED CONTENT CO-CREATION

CROSS-REFERENCE TO RELATED APPLICATIONS

The current application claims the benefit of and priority under 35 U.S.C. § 119 (e) to U.S. Provisional Patent Application No. 63/254,062 filed Oct. 9, 2021 titled "Token Evolution with Physical Embodiment"and U.S. Provisional Patent Application No. 63/282,923 filed Nov. 24, 2021 titled "Content Co-Creation Mechanism and Technology", the disclosures of which are hereby incorporated by reference in their entireties for all purposes.

FIELD OF THE INVENTION

This invention relates to cryptography. More particularly it relates to accessing, modifying content based on tokens, securely modifying access rights, and linking physical assets to tokens.

BACKGROUND

Cryptography can be used to provide security, privacy and authenticity to transactions. Some cryptographic components, such as digital signatures and encryption functions, are standardized and well-studied with known security characteristics. Cryptography can be used to create immutable ledgers such as (but not limited to) blockchains. Immutable ledgers and blockchains can be based on a variety of cryptographic methods. In some implementations of immutable ledgers and blockchains, mining is used to securely add information. Mining can include computer systems (often referred to as "miners") generating proofs based on computational challenges. Generally, a proof can be an output of a function that conforms to one or more requirements defined by a challenge. A proof protocol can be a function used to generate a proposed proof. The proof protocol can be iteratively performed until a proof is generated which meets the requirements of the challenge. The requirements of the challenge can be based on a difficulty. Mining can also include the use of computer systems known as "verifiers" that perform processes to check the generated proofs. In many instances, a proof can be easily verified based on providing successful inputs to a verifier. Miners and verifies can be implemented using any one or more of personal computers, application-specific integrated circuits, mobile devices (e.g. a mobile phone or tablet), server computer systems, virtual machines executing on computer systems, and/or any other form of computing device capable of performing computations associated with the performance of a particular mining or verifier function.

SUMMARY OF THE INVENTION

In various embodiments, a device can be configured to evolve in response to a token evolution, the token recorded on a distributed ledger, the distributed ledger capable of immutably recording data. In an embodiment, the device includes an output device, memory, and a processor. The processor configured to receive an identifier and a first authenticator value associated with a token, and receive a second authenticator value. The second authenticator value associated with a physical element. The processor further configured to determine a state associated with the token, determine whether the second authenticator value satisfies a condition based on the identifier, and receive a signal. The signal including a third authenticator value. The processor further configured to determine whether the second authenticator value matches the third authenticator value, generate a transaction record when the second authenticator value matches the third authenticator value and the second authenticator value satisfies the condition. The transaction record associating the state with the second authenticator value. The processor further configured to transmit the transaction record. The transaction record configured to be incorporated into a ledger entry. The ledger entry capable of being used to compute a challenge for securely adding the ledger entry to a distributed ledger using a cryptographic system.

In another embodiment, the second authenticator value comprises a portion of the identifier.

In a further embodiment, the second authenticator value comprises a portion of the first authenticator value.

In an additional embodiment, the second authenticator value is stored in a memory physically associated with the physical element.

In some other embodiment, the signal is received using a radio.

In still another embodiment, the second authenticator value is received based on a scan of a machine-readable tag.

In yet another embodiment, the signal is received using a camera.

In yet still another embodiment, the state comprises an indication of a stage of evolution.

In yet another again embodiment, associating the state with the second authenticator value triggers an evolution of the physical element.

In several embodiments, a device can be configured to implement a distributed ledger, the distributed ledger capable of immutably recording derivative tokens. In an embodiment, the device includes an output device, memory, and a processor. The processor configured to receive a building block token. The building block token including access rights to first content, a reference to the first content and a first digital signature. The processor further configured to receive second content, generate third content based on the second content and based on accessing the first content, and generate a transaction record to mint a derivative token. The transaction record including a reference to the building block token, a reference to the second content, a reference to the third content, and a second digital signature. The process further configured to transmit the transaction record. The transaction record configured to be incorporated into a ledger entry. The ledger entry is capable of being used to compute a challenge for securely adding the ledger entry to a distributed ledger using a cryptographic system.

In a further embodiment, the building block token is a non-fungible token.

In a still further embodiment, the derivative token references a first identity value associated with the first content, and a second identity value associated with the second content.

In a yet further embodiment, the first digital signature is generated based on a first identity value.

In a further embodiment again, the second digital signature is generated based on a second identity value.

In a still yet further embodiment, the first content is associated with a type selected from a list of an audio file, a movie file and an image file.

In a yet still further embodiment, the second content is associated with a type selected from a list of an audio file, a movie file and an image file.

In an additional further embodiment, the transaction record further comprises instructions for combining the first content and second content.

In a still additional further embodiment, the building block token further comprises a limiting statement.

In a still yet additional further embodiment, the building block token further comprises a digital rights management element specifying the use of the derivative token.

In a yet still additional further embodiment, the building block token further comprises a reference to data associated with a first content creator.

In a still further embodiment again, the derivative token further comprises a reference to data associated with a first content creator and a reference to data associated with a second content creator.

In a yet further embodiment again, the derivative token comprises a digital signature associated with a second content creator.

In a yet still further embodiment again, the digital signature associated with a first content creator is generated, at least in part, using the first content.

In an additional further embodiment again, first digital signature associated with a first content creator is verified, at least in part, using the first content.

In a still yet additional further embodiment again, the derivative token is generated conditional on satisfying a policy associated with the building block token.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
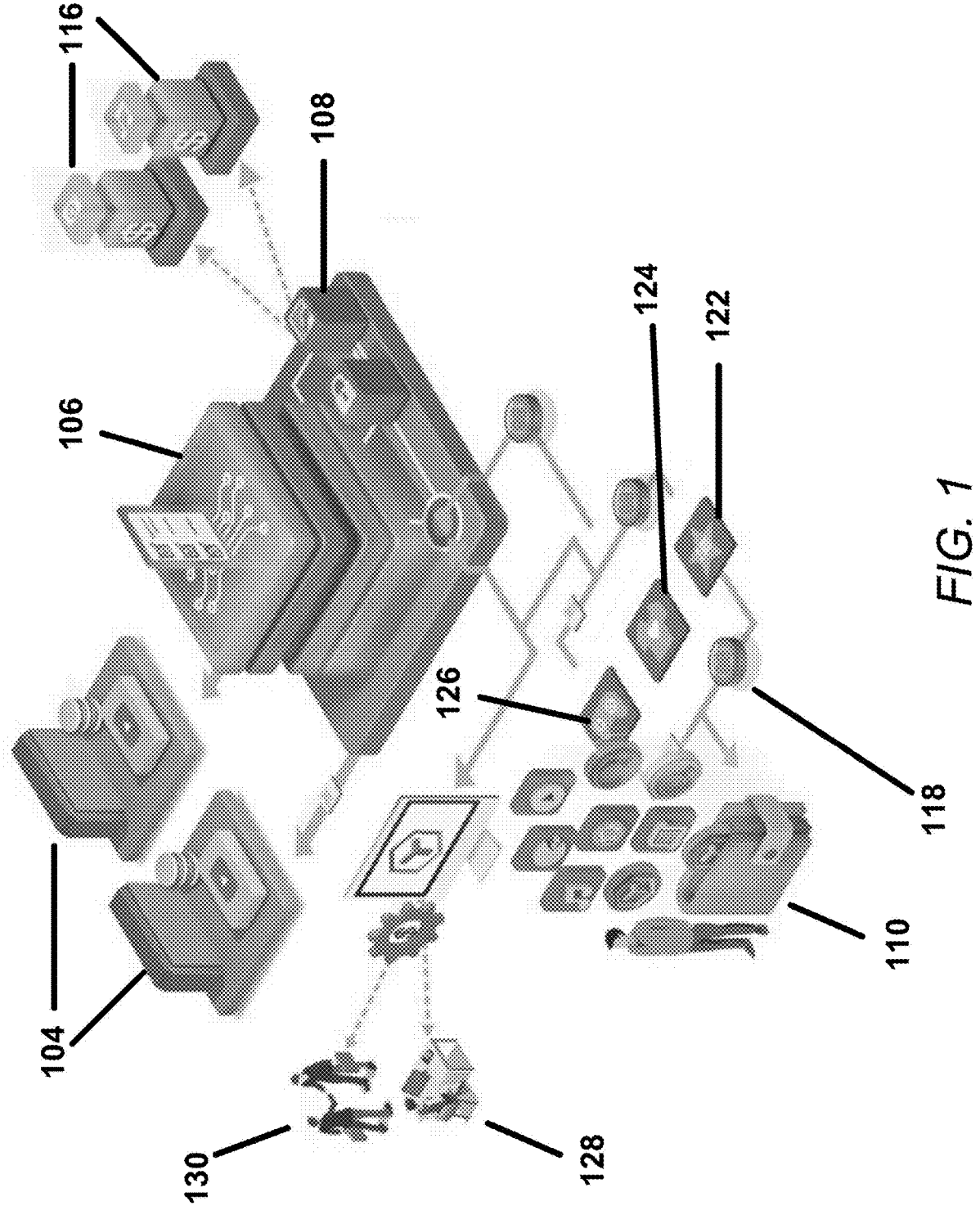
FIG. 1 is a conceptual diagram of an NFT platform in accordance with an embodiment of the invention.

Evolution for tokens is disclosed in a co-pending application titled "Content Evolution Techniques" by Markus Jakobsson. However, that technique is specific to digital representations of content, such as a movie, an image, or a video, and is not enabling corresponding evolution features for physical embodiments. Bridging the gap between physical and digital representation is valuable as it adds dimensionality to content. In several embodiments changes with respect to digital representations can trigger changes to physical representations. Furthermore, in various embodiments, physical representations can include authenticating values that can be used to verify connections, and evolutions of physical and/or digital representations.

Artists need to establish connections with their most passionate fans. The most passionate fans, in turn, wish to express a connection with the artists. One such way is for the fans to acquire the rights to create collaborative works. However, today's technology does not enable this. First of all, it does not enable artists to selectively charge for the right to create collaborative works, nor even to limit who can create collaborative works. From the perspective of the fans, today's technologies do not offer any support for provenance proofs, wherein the origin of the components of a collaborative effort are made verifiable. Therefore, the fans cannot know for sure that the content they receive from an artist truly originated with that artist, nor is it possible for others to verify the provenance of the collaborative work. In various embodiments, methods can address this problem, thereby allowing artists and fans to collaborate, artists to earn significant income, and fans to provide evidence of their collaboration (e.g., creating collaboratively performed songs that can be publicly verified to be originated by the artist and the fan).

In several embodiments, building block tokens confer the capability to create derived works with shared co-creatorship. In accordance with various embodiments of the invention, derivative tokens can be generated based on building block tokens. Derivative tokens can allow the generator the derivative token to share ownership and/or access rights with the building block token creator. In some embodiments, derivative tokens can be generated based on derivative tokens. In several embodiments, derivative tokens allow the integration of content from multiple sources by anybody with ownership access to the associated building block tokens and/or derivative tokens. In various embodiments, building block tokens and derivative tokens can, by virtue of being distinct from other NFTs in terms of the rights they confer, provide a valuable source of income for their associated creators.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users 128. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned block-chains are closed systems that are limited to publicly inaccessible transactions. In many embodiments, the permissioned blockchain can be in the form of distributed ledgers, while the blockchain may alternatively be centralized in a single entity.

Figure 2:
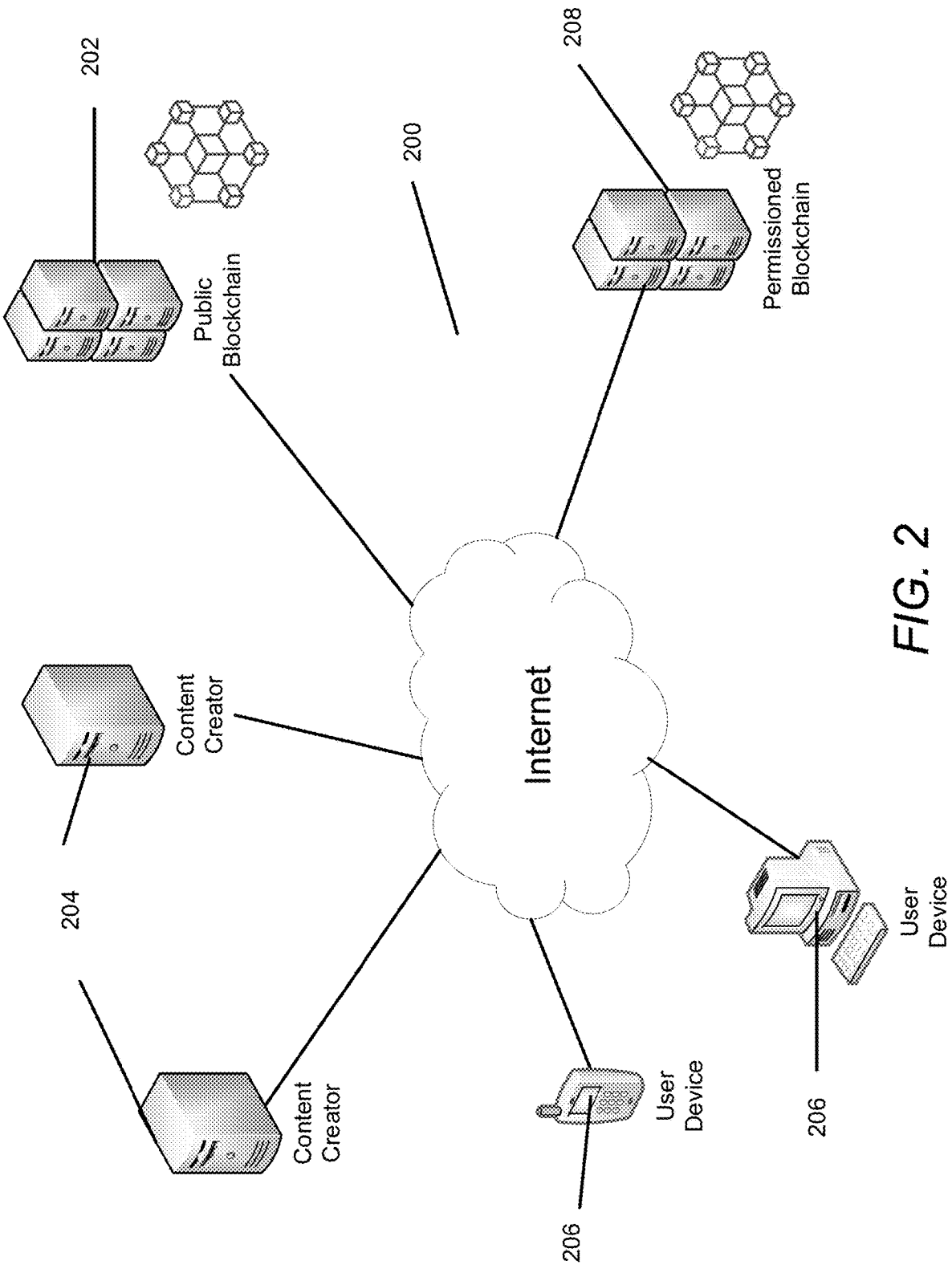
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public block-chain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the per-missioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the require-ments of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
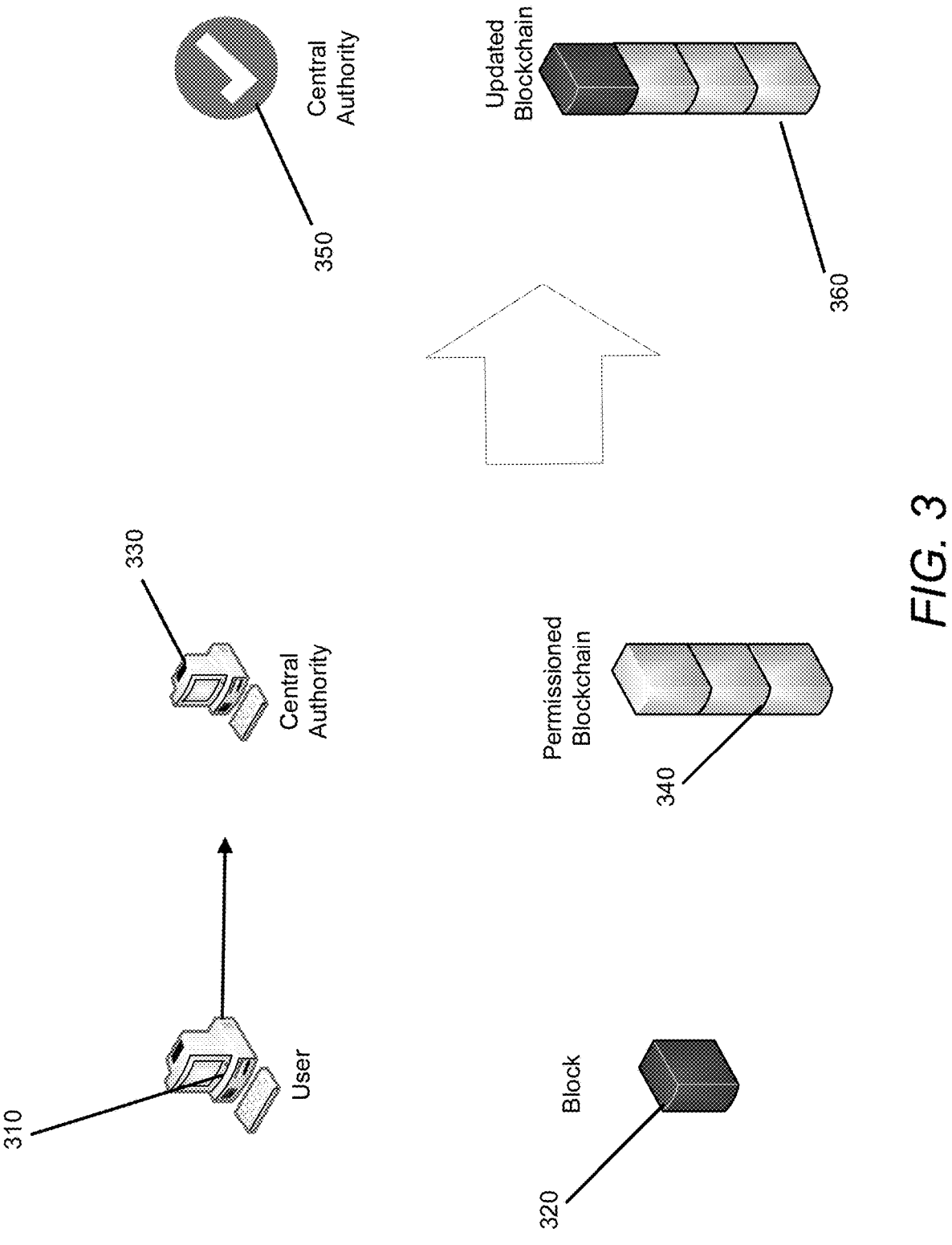
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
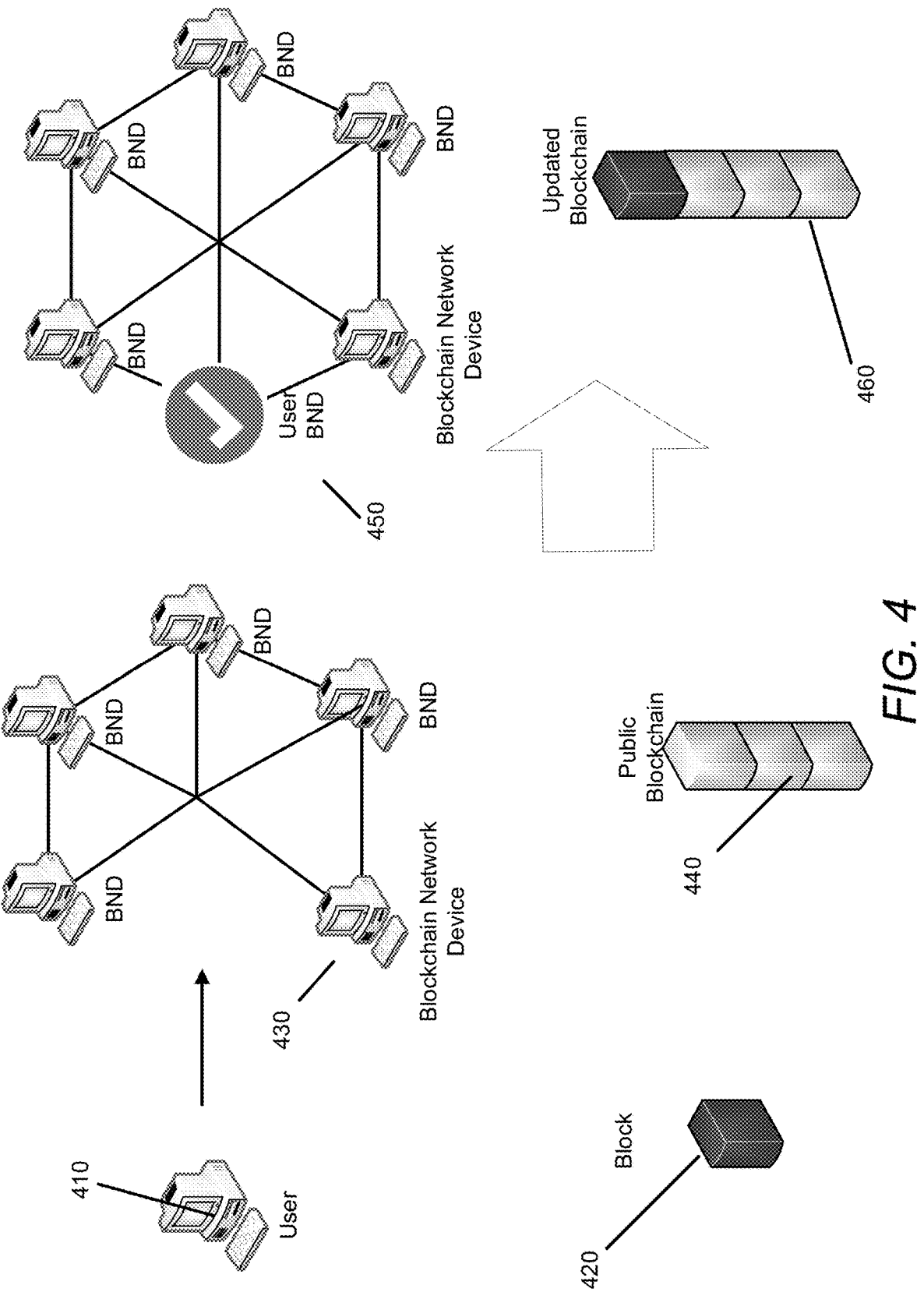
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions.

In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
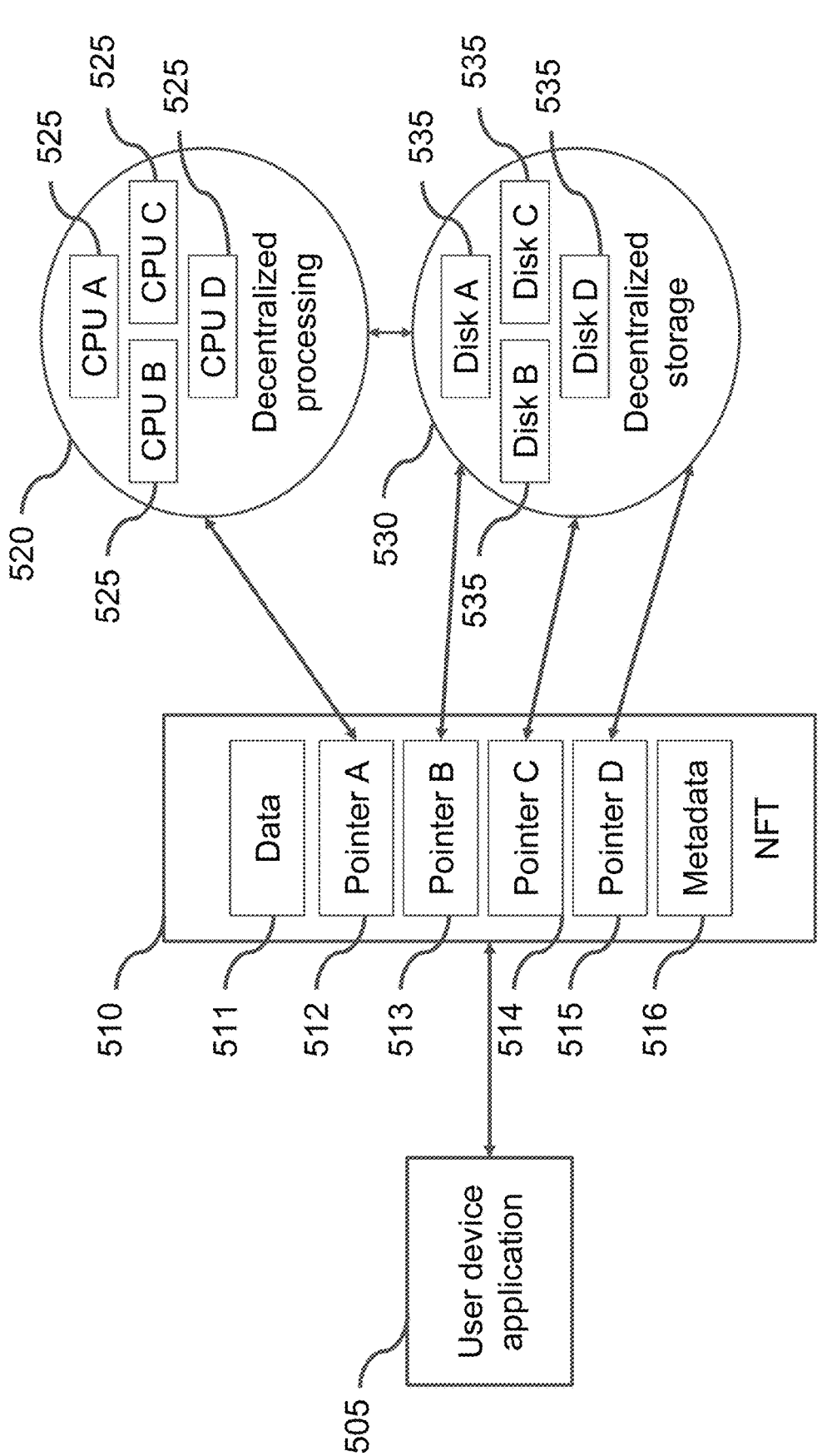
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
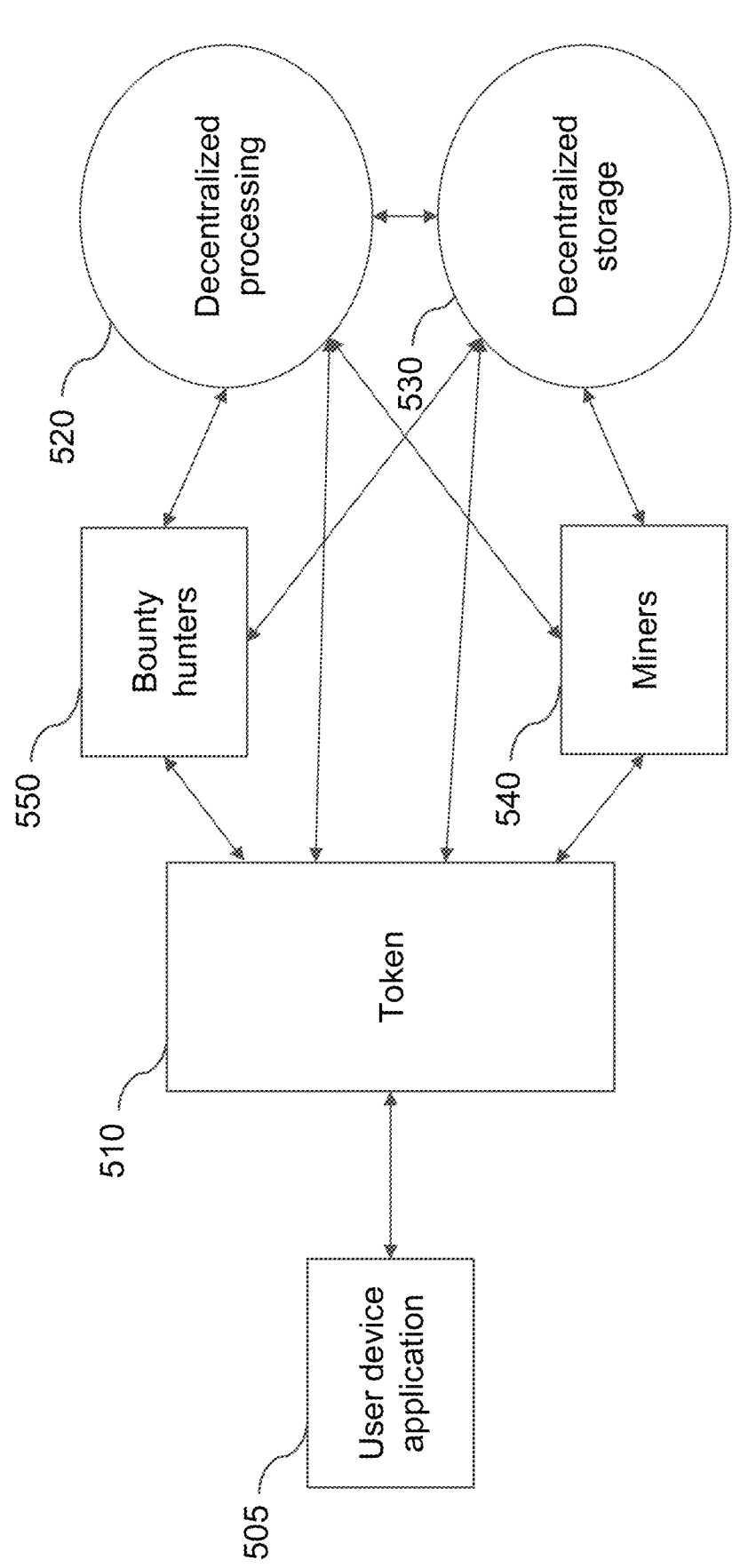

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
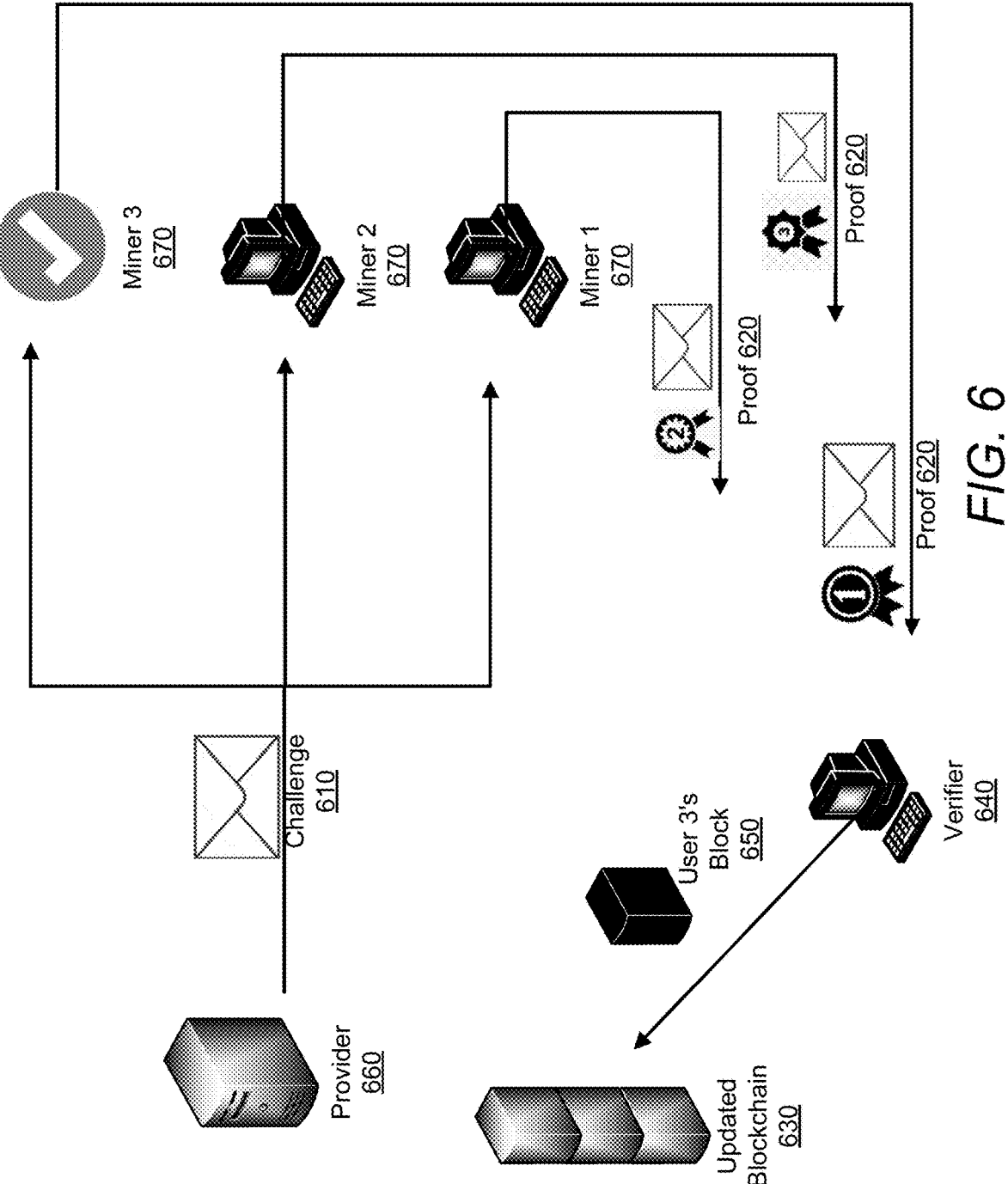
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party/provider 660 presents a complex problem ("challenge") 610 and another party must broadcast a valid answer ("proof") 620 to have clearance to add a block 650_to the decentralized ledger that makes up the blockchain 630. As a number of miners 670 may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 (i.e., the block corresponding to the winning proof 620) _to the blockchain 630. As such, under a Proof of Work consensus mechanism, each miner 670 involved can have a success probability proportional to the computational effort expended.

Figure 7:
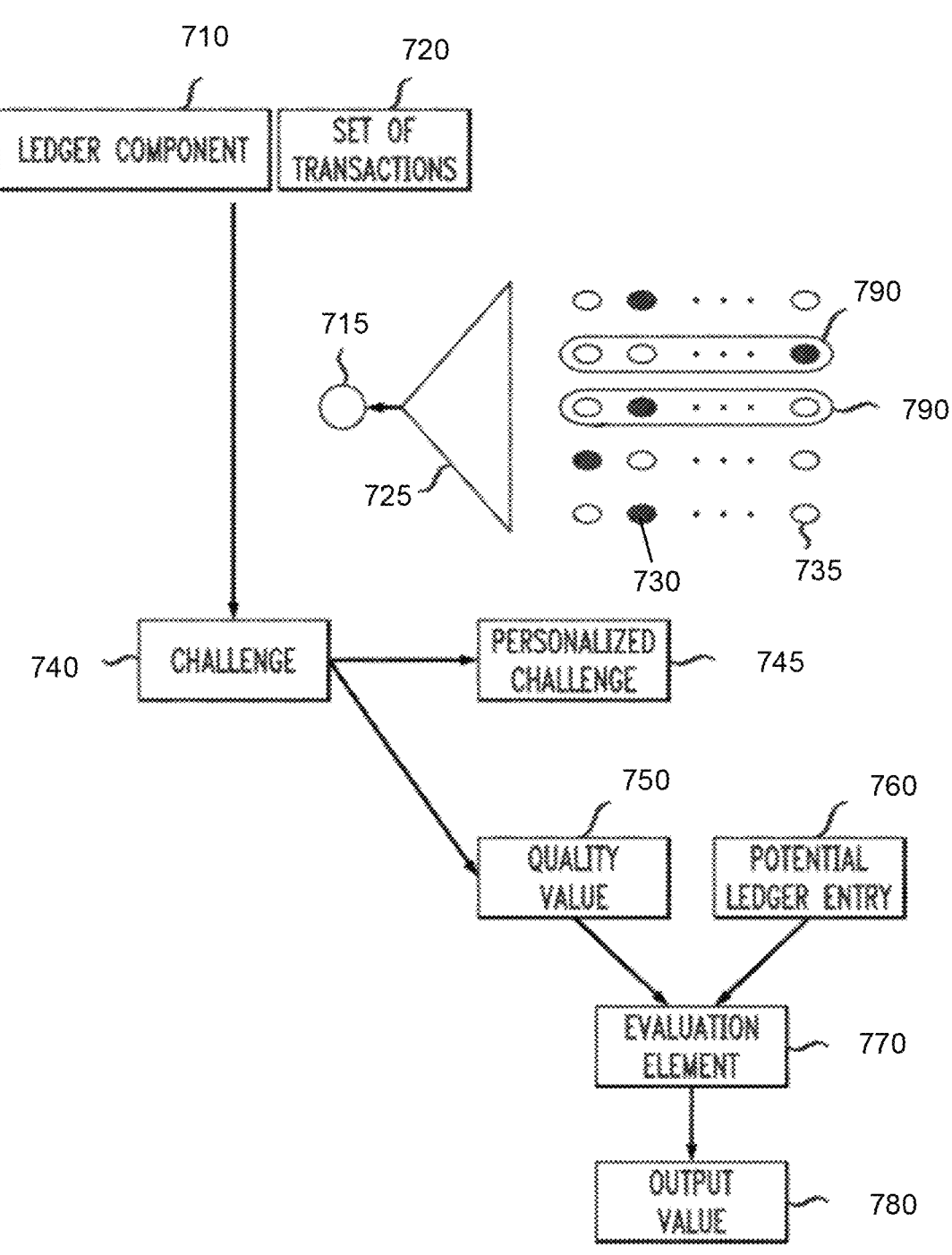
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

hi some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
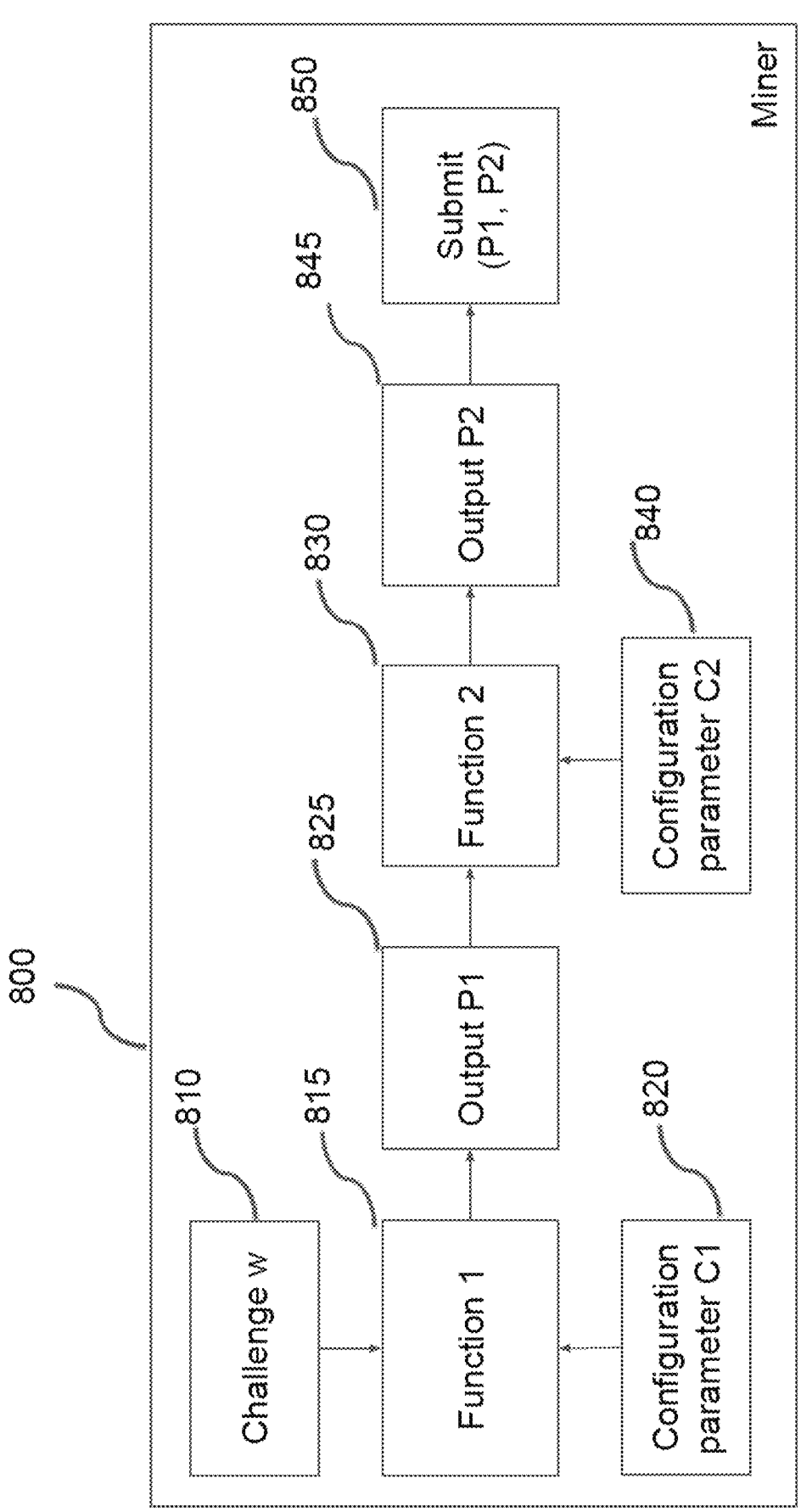
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone(™) or Intel SGX(™) may provide assurances exist of integrity by virtue of incorporating private/isolated processing environments.

Figure 9:
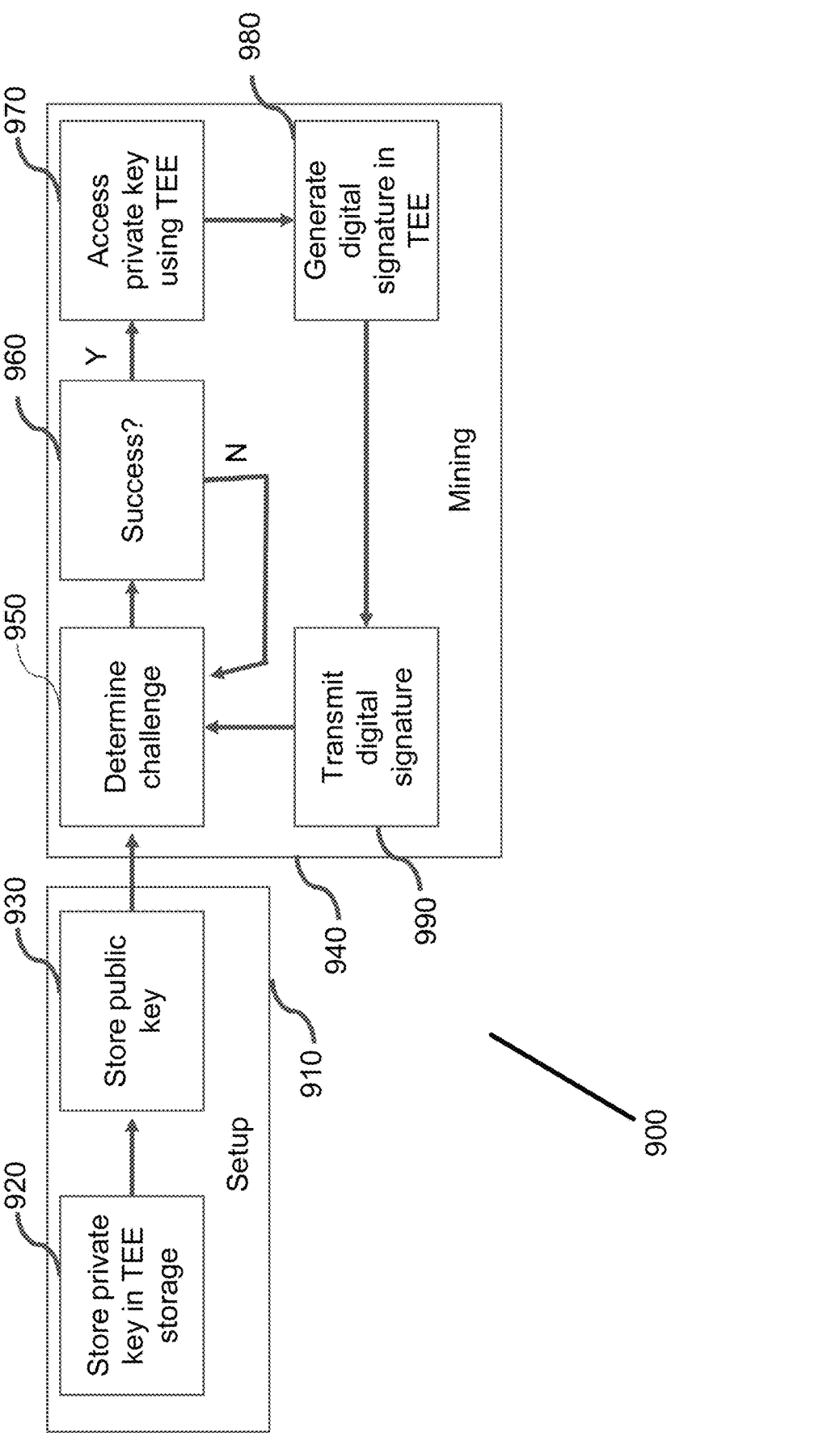
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. in several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
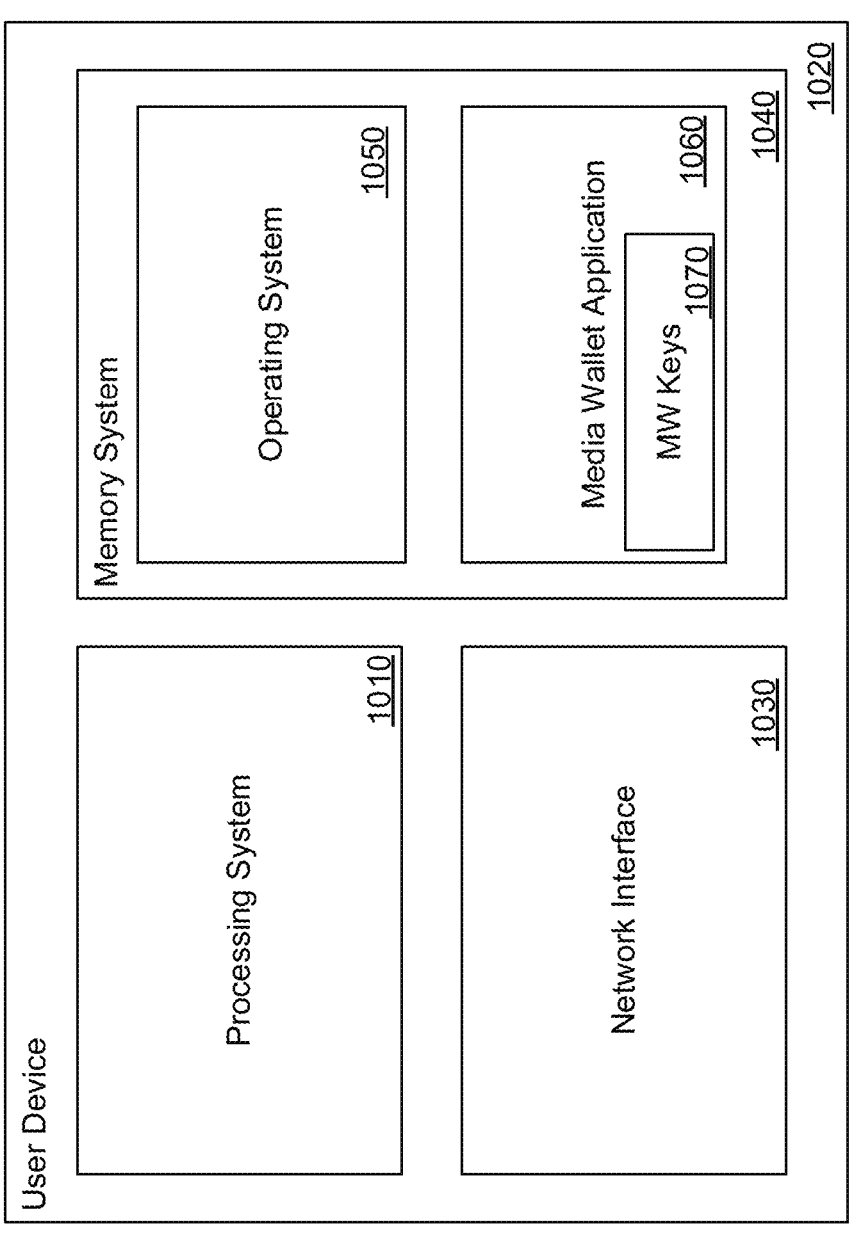
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
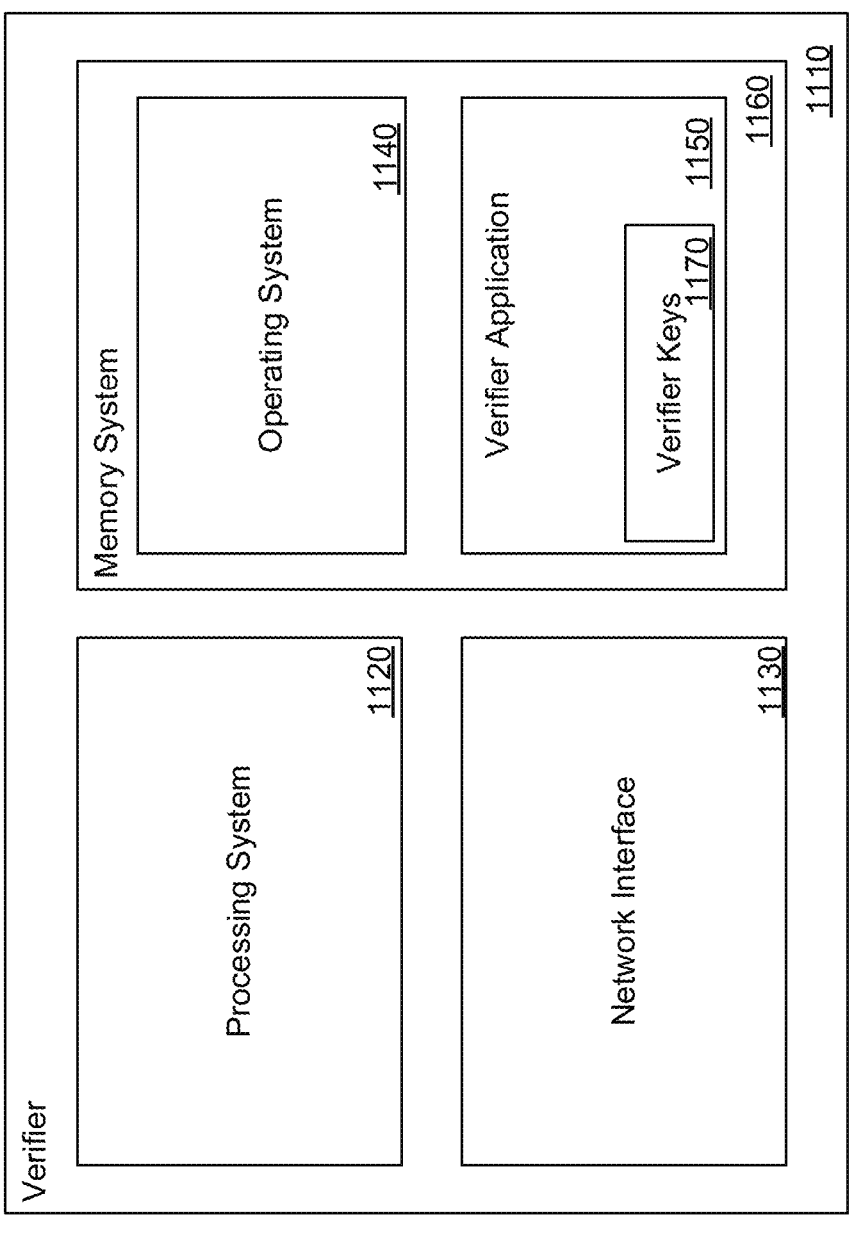

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
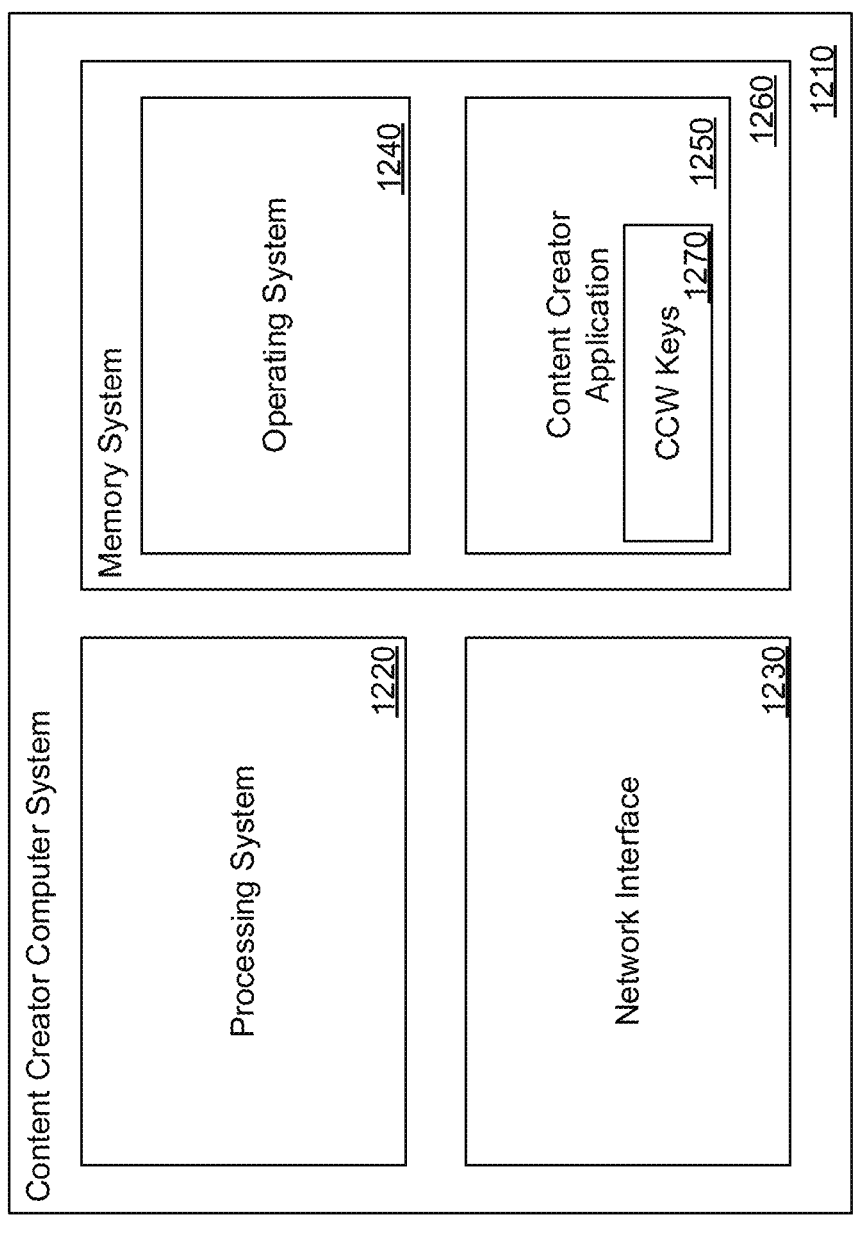

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
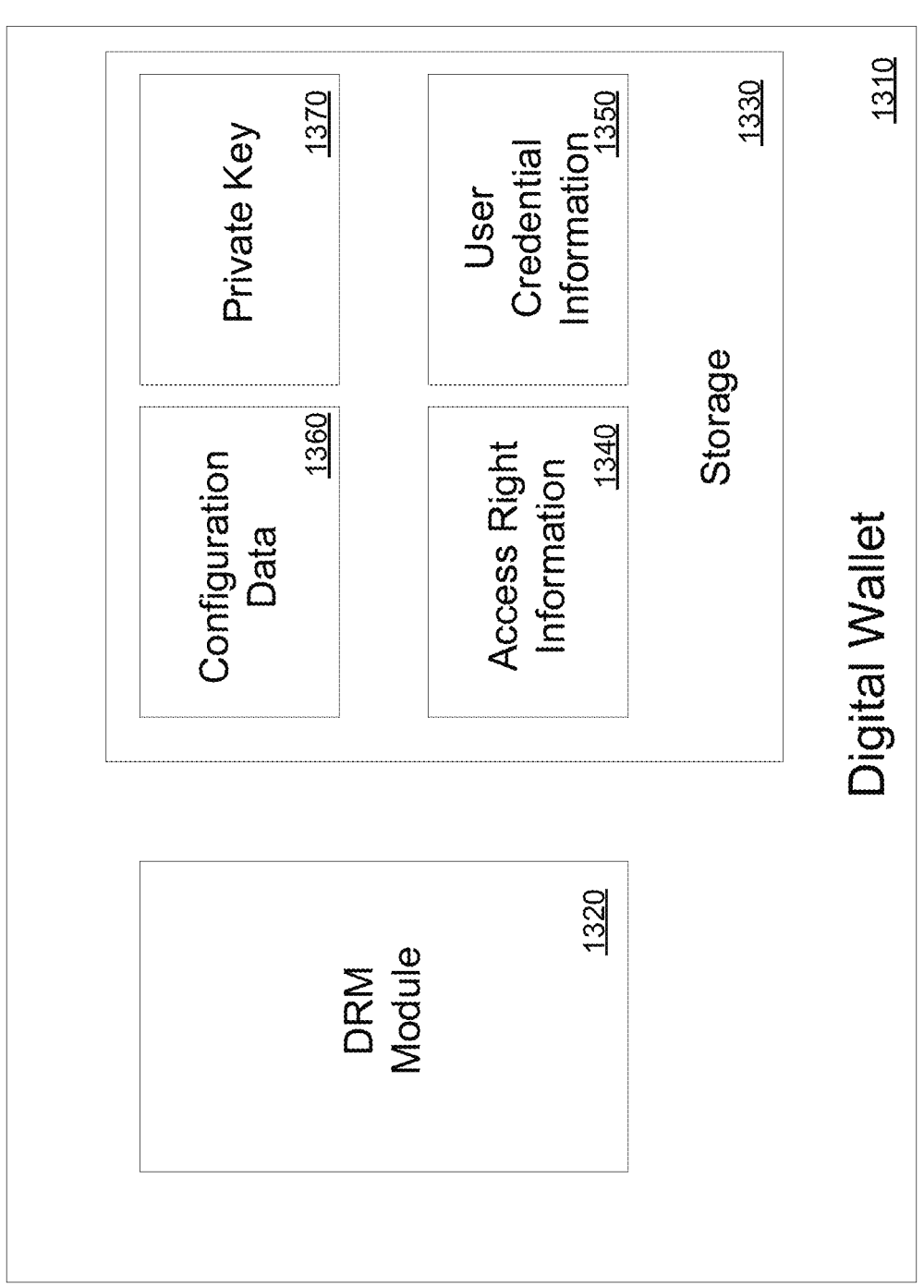
FIGS. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
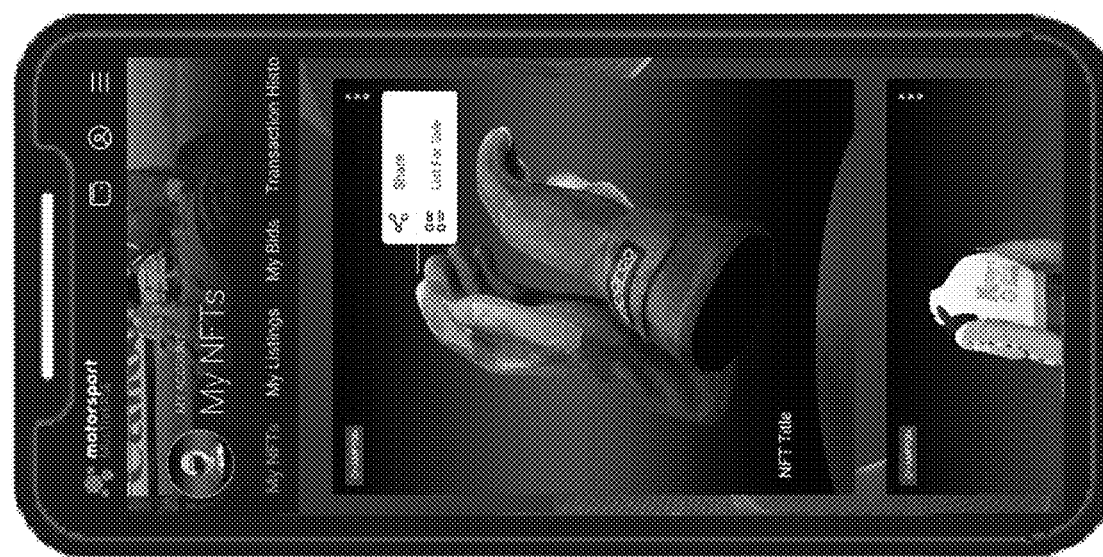
FIGS. 14A-14C depicts user interfaces of various media wallet applications in accordance with a number of embodiments of the invention.
Figure 14A:
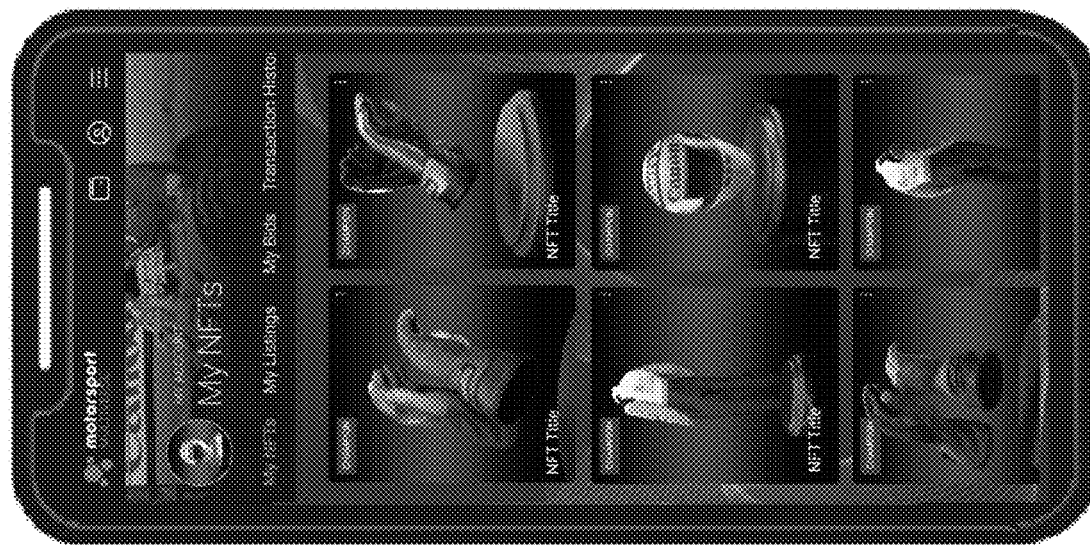
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs.

This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
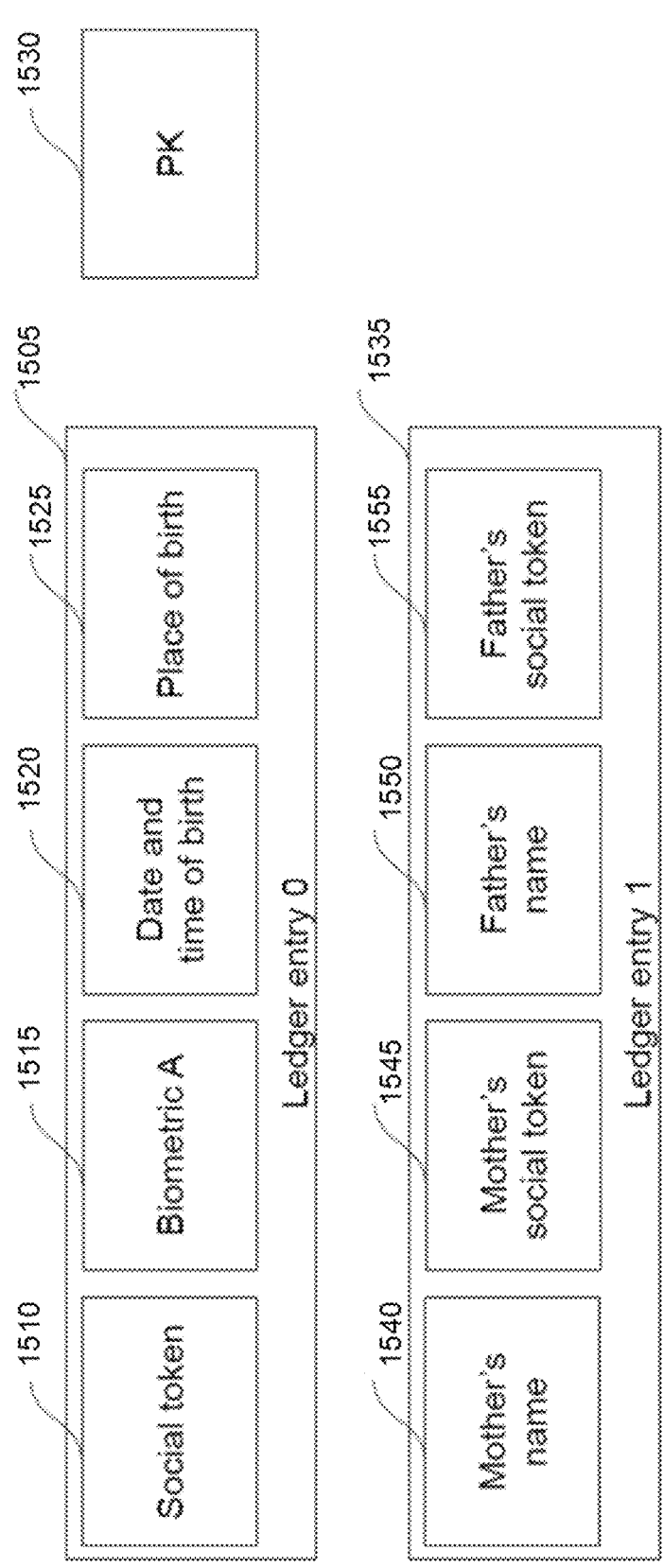
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
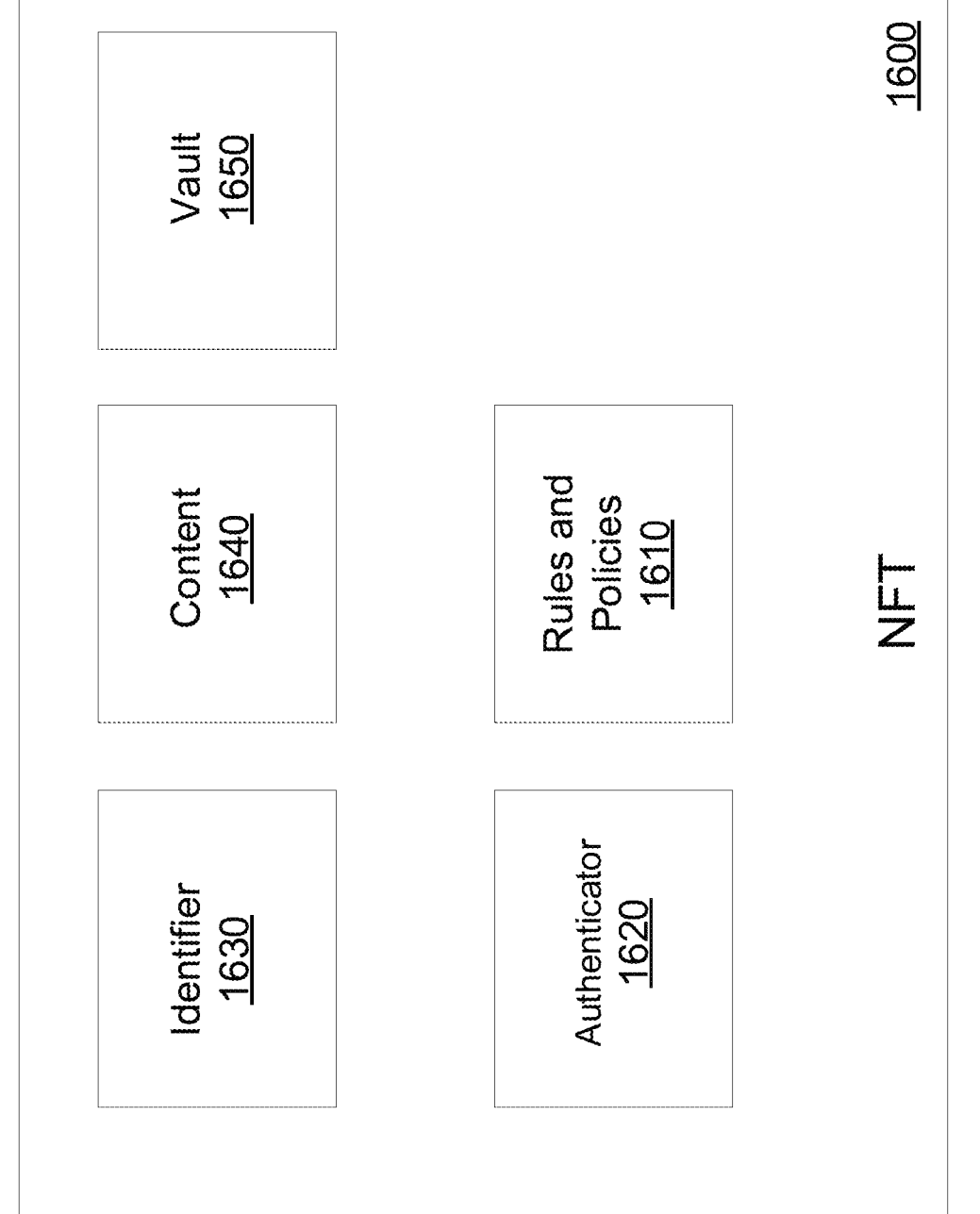
FIGS. 16A-16B illustrate an NFT arrangement relationship with corresponding physical content in accordance with an embodiment of the invention.
Figure 16B:
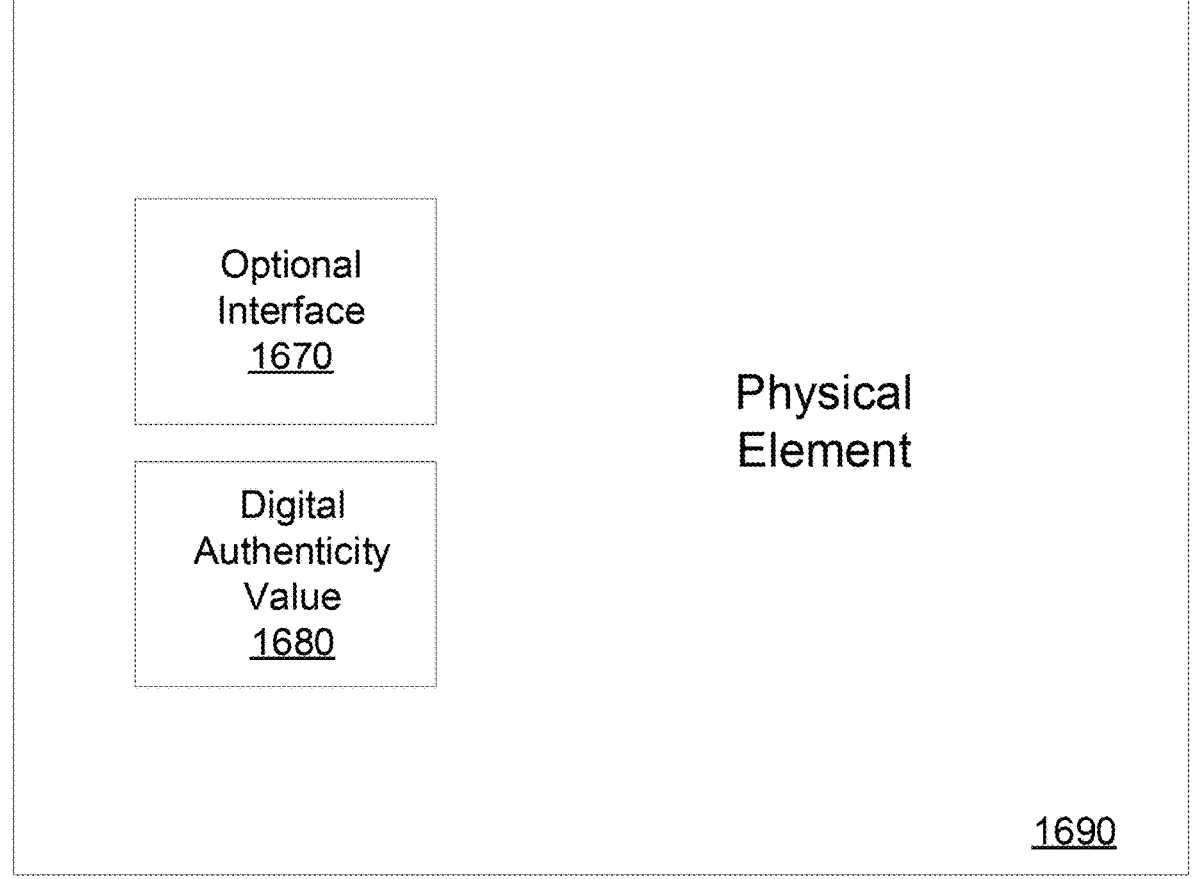

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV)

1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
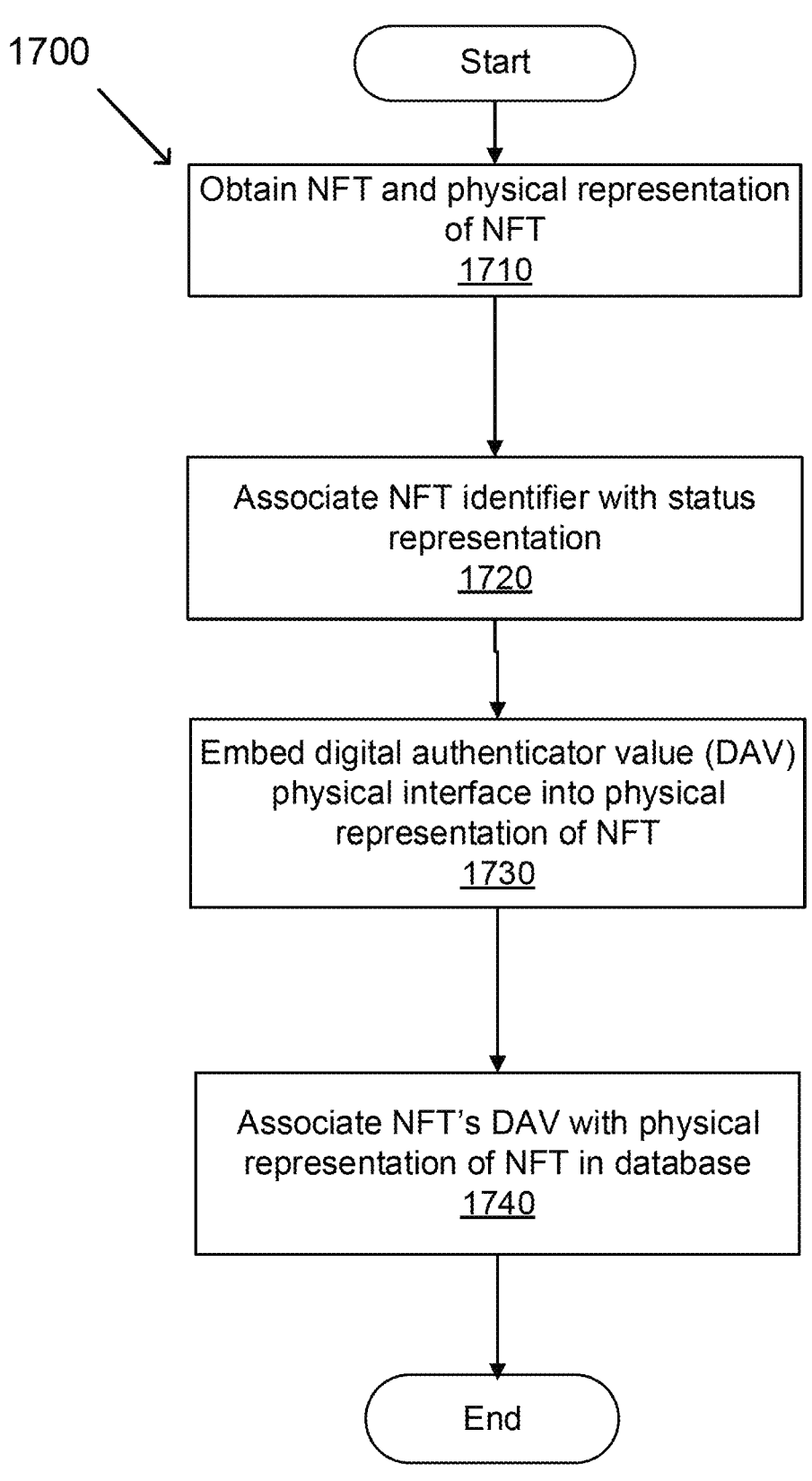
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Token Evolution with Physical Embodiment

Figure 18:
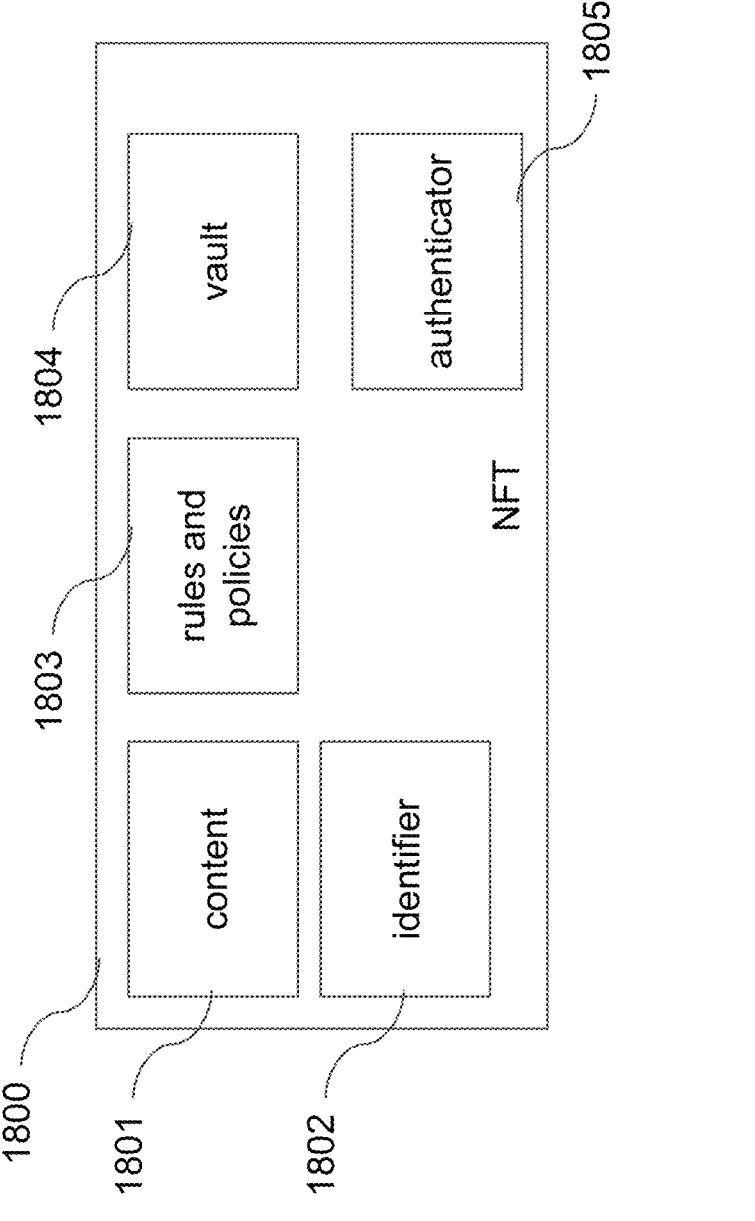
FIG. 18 conceptually illustrates an NFT including content and content identifiers.

In accordance with embodiments of the invention, non-fungible tokens ((NFTs) can include content, identifiers, vaults, authenticators, rules and/or policies. An NFT including content and content identifiers is conceptually illustrated in FIG. 18. An NFT 1800 includes content 1801, an identifier 1802 of content 1801, and optional rules and policies 1803. In several embodiments, rules and policies that can state the terms of usage, royalty requirements, transfer restrictions, and more. NFT 1800 can include a vault 1804. A vault can be an access-controlled data storage area. A means of access-control can, in accordance with some embodiments of the invention, be able to encrypt the contents. In several embodiments, access-control can be managed using access control lists (ACLs). ACLs can be protected by a digital rights management (DRM) software unit that may be running in a trusted execution environment (TEE). NFT 1800 can include an authenticator 1805. In many embodiments, authenticators can be digital signatures on one or more of content, content identifiers, rules and policies, vaults, and/or any additional elements of the associated NFT.

While specific processes and/or systems for NFTs including content and content identifiers are described above, any of a variety of processes and/or systems can be utilized to use NFTs including content and content identifiers as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to NFTs including content and content identifiers, the techniques disclosed herein may be used in any type of cryptographic system. The techniques disclosed herein may be used within any of the rich media systems, permissioned blockchains, distributed ledgers, processes and systems for token evolutions with physical embodiments, and/or processes and systems for content co-creation mechanisms as described herein.

Figure 19:
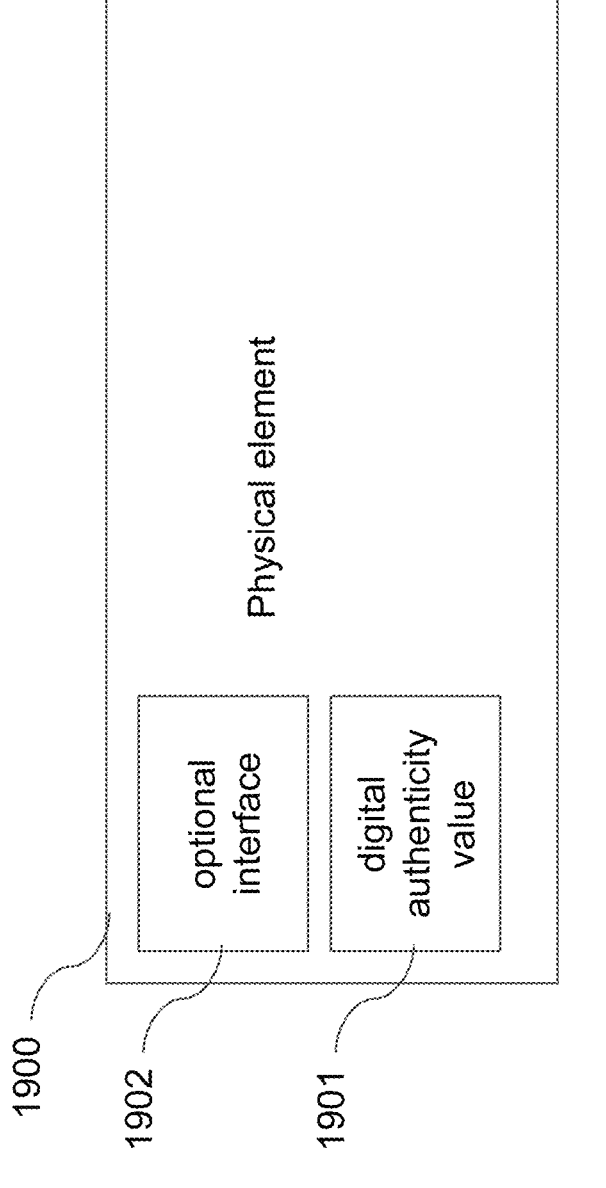
FIG. 19 conceptually illustrates a physical element associated with a digital authenticity value.

A physical element can be associated with a digital authenticity value in several embodiments. A physical element associated with a digital authenticity value is conceptually illustrated in FIG. 19. A physical element 1900 can be associated with a digital authenticity value 1901. In some embodiments, the physical element can be a physical artwork such as a painting, a drawing, a statue, or another physical representation of art. Digital authenticity value 1901 can be associated with physical element 1900. An interface 1902 can be optionally included in the physical element. In some embodiments, an interface can be at least in part physically integrated in the underlying material associated with a physical element (e.g., as a PUF integrated in the fibers of a canvas, a processor and associated memory glued to the surface of an artwork and/or incorporated in the substance of a physical element, and/or a QR code attached to the surface of the physical element. In accordance with several embodiments of the invention, a physical interface can be a radio unit (e.g., as part of an RFID chip), or it may be an access window for the scanning of an optical PUF. In several embodiments, a digital authenticity value can include an identifier (e.g., a content identifier, and/or content identifier 1802) and/or an associated authenticator (e.g., authenticator 105). Other identifiers and authenticators can also be used. In various embodiments, the interface can be configured to convey the digital authenticity value. The digital authenticity value can be based on a private key.

While specific processes and/or systems for physical element associated with a digital authenticity value are described above, any of a variety of processes and/or systems can be utilized to use physical element associated with a digital authenticity value as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to physical element associated with a digital authenticity value, the techniques disclosed herein may be used in any type of cryptographic system. The techniques disclosed herein may be used within any of the rich media systems, permissioned blockchains, distributed ledgers, processes and systems for token evolutions with physical embodiments, and/or processes and systems for content co-creation mechanisms as described herein.

A process can access a digital authenticity value associated with a physical element in several embodiments. A process that can access a digital authenticity value is conceptually illustrated in FIG. 20. A reader process 2000 can access a digital authenticity value 2002. In various embodiments the digital authenticity value is stored in connection with a physical element. In various embodiments, accessing a digital authenticity value can include scanning and/or interacting with an interface associated with a physical element. The process 2000 can access a database 2004. In accordance with embodiments of the invention, a database can be a proprietary database and/or a blockchain. The database can include data associated with an NFT. Based on reading the digital authenticity value, optionally verifying associated authenticator values, and/or by comparing at least portions of a digital authenticity value to data associated with an NFT stored in an accessed database, processes in accordance with many embodiments of the invention can generate a determination. A determination could include descriptions of a physical element (e.g., "valid artwork"), an indication of a correspondence between an NFT and the physical element (e.g., "corresponds to NFT #XYZ"), an identifier such as content identifier, a validity indicator, and/or other values.

In some embodiments, physical representations of content can correspond to a series of paintings, each one of which may have an associated number (e.g., such as for a lithography). In several embodiments, physical representations of content can be embedded with digital authenticity values. Digital authenticity values can be referred to as validator values. In several embodiments, validator values can be values that include identifiers and/or digital signatures on identifiers. Identifiers can specify the name of a creating entity, a digital correspondent of the physical content, a serial number, and/or other information such as when the physical representation was created, and/or a reference to a database in which sales data for the content is maintained. In various embodiments, digital signature elements can be generated by the creating entity, and/or by an authority associating the content with the content creator. In many embodiments, digital signature elements can include one or more certificates, as will be understood by a person of skill in the art. Embedded values in accordance with numerous embodiments of the invention can be stored in chips connected to radio transmitters (e.g., RFID transmitters). In some embodiments, the chips can be embedded in the physical artwork in a manner that causes the destruction of either the artwork or the chip, or both, if a person tries to disassociate the two from each other. In some embodiments, the chip and the associated RFID transmitter can be encapsulated in the canvas or paint on the canvas. In several embodiments, the parts of a physical representation can be glued together in a way that would ruin at least one of the physical representation and the chip if they were to be separated. In various embodiments, a person with physical access to the physical artwork can scan the RFID transmitter, verify the validity of the associated value, and verify, by looking at the artwork, that the RFID transmitter has not been forcefully removed from it or otherwise disassociated from it. In accordance with embodiments of the invention, when the associated value includes a digital representation of the physical artwork, that element can be used to verify that the artwork has not been modified (e.g., where such a modification may be done to disassociate an RFID transmitter from one art piece and associate it with another).

The use of memory and associated RFID transmitted is only one approach to associate a digital authenticity value with a physical element. In some embodiments, an approach is to use a Physically Unclonable Function (PUF). A PUF can be implemented in a variety of manners and incorporated with the physical element in a way that they cannot be separated from each other without damaging at least one of the PUF and the physical item in a way that is immediately detectable. PUFs are described, e.g., in Gao, Y., Al-Sarawi, S. F. & Abbott, D. Physical unclonable functions. Nat Electron 3, 81-91 (2020). Another overview is provided in Alireza Shamsoshoara, Ashwija Korenda, Fatemeh Afghah, Sherali Zeadally, "A survey on physical unclonable function (PUF)-based security solutions for Internet of Things," Computer Networks, Volume 183, 2020. An example PUF is disclosed in Pim Tuyls, Geert-Jan Schrijen, Boris Skoric, Jan van Geloven, Nynke Verhaegh and Rob Wolters: "Read-proof hardware from protective coatings", CHES 2006, pp 369-383. An optical PUF is described in R. Pappu, "Physical One-Way Functions", PhD Thesis, MIT, 2001. Also see Pappu, R.; Recht, B.; Taylor, J.; Gershenfeld, N. (2002). "Physical One-Way functions". Science. 297 (5589): 2026-2030. In accordance with several embodiments of the invention, PUFs can be integrated in physical elements such as textiles, canvases, plastics, and more. PUFs can also be embedded in silicon representations, e.g., in circuits or memory. In several embodiments, a PUF can be combined with an RFID for conveying data. In various embodiments, PUFs can be read by cell phones or other cameras, IR readers, as well as special-purpose readers, depending on the type of PUF and the required precision.

In various embodiments, the digital authenticity value of physical elements are expressed using visual representations. Example visual representations are described in U.S. Provisional Patent Application No. 63/066,087 filed Aug. 14, 2020 titled "Security Enhancements Using Atomic State Change and Management" and U.S. patent application Ser. No. 17/401,687 filed Aug. 13, 2021 titled "Proxy Management and Attribution", which are hereby incorporated by reference. A visual representation can be a barcode and/or a QR code encoding the digital authenticity value. Digital authenticity in accordance with many embodiments of the invention can also be represented in a database. The visual representation can be associated with the physical element (e.g., by the barcode and/or QR tag being glued to and/or printed on the back of a canvas). In several embodiments, such a QR tag can be possible to physically disassociate from the physical item it is attached to. Such a QR tag can only be used to express authenticity of a single physical item. Multiple registrations can be detected and blocked during the registration of the second of two physical items with a single code. As an example. When a very believable forgery is made of a physical representation, and the QR code moved from the original physical representation to the forged physical representation, then, as a result, only the forged representation may be considered authentic. The original would lack the QR code and therefore be unverifiable.

In some embodiments, when a copy of a code associated with a physical representation is used to register ownership it can be rejected. In accordance with embodiments of the invention, verification of the validity of a physical item, can be determined based on receiving a code (e.g., scanning the QR code) and determining whether an ownership has already been assigned, or has already been assigned to an entity other than the entity now providing the code.

In accordance with various embodiments of the invention, physical items can be associated with controls that prevents forgeries to be registered as legitimate. Unregistered forgeries can be considered not valid. In several embodiments, when a content creator receives a physical element from an owner, the content creator can deregister the physical element by causing its representation to be erased from a database used to track ownership, and/or in the case of an immutable blockchain record, the ownership chain may be appended with new information. In many embodiments, when the owner returns a physical element, to a content creator in order for the content creator to replace it with an "evolved" version. In accordance with embodiments of the invention, the owner can be required to transfer the ownership of the physical element to the content creator, or place the physical element in a stage of being evolved. In some embodiments, the content creator can then verify that the owner has the ownership right, and/or that the physical element is in the requested state. In several embodiments, based on the successful verification, the content creator can request to have the entry in the database (e.g., blockchain) erased or updated to indicate that the physical element has been destroyed. In certain embodiments, the content creator can transmit a new physical element, and/or modify the existing physical element, where the transmitted item is associated with a new QR code before being shipped. In some embodiments, the content creator can move a QR code from the received physical element to a new, evolved representation. The evolved representation can correspond to a new physical element. In several embodiments, the content creator can cause an update in an ownership database indicating that the old code (e.g., QR code) is now is associated with an evolved version. In a number of embodiments, databases can store representations of the post-evolution physical representations (e.g., a visual representation of the post-evolution physical representation). A person of skill in the art will recognize that alternative representations and conveyances of the digital authenticator value can be used (e.g., the transmission of a unique bit string using a radio such as that of an RFID chip).

In accordance with numerous embodiments of the invention, digital authenticity values are used to verify a correspondence between the physical element (e.g., physical representation), and a digital element (e.g., token, ledger entry, NFT, and/or other digital representation). Digital authenticity values can, in some embodiments, be stored in memory and conveyed using an RFID sensor and/or other radio (e.g., Bluetooth or Bluetooth Low Energy (BLE) radio), and/or represented as a PUF. PUFs can be read using various tools such as a radio and/or an optical reader. In many embodiments, verifications of correspondence can be made by content creators and/or other entities.

In some embodiments, verifying the correspondence between physical representations and digital representations can require accessing a database. The database can be a proprietary database, a public database, a distributed database such as a blockchain based storage, etc. In several embodiments, databases can include information used to validate tokens and physical elements, such as lists of valid identifiers and their associated states. In several embodiments, a state can be whether a digital representation and/or a physical representation has evolved and/or what evolution a digital and/or physical representation possesses. In various embodiments, a state is whether a token or physical element is associated with a certificate revocation list (CRL). The CRL can indicate that the corresponding digital or physical representation is not legitimate. In accordance with some embodiments of the invention, the database can be used to record information indicating ownership. Ownership information can indicate pseudonyms, public keys, and/or real-world identities.

While specific processes and/or systems for accessing a digital authenticity value are described above, any of a variety of processes and/or systems can be utilized for accessing a digital authenticity value as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to accessing a digital authenticity value, the techniques disclosed herein may be used in any type of cryptographic system. The techniques disclosed herein may be used within any of the rich media systems, permissioned blockchains, distributed ledgers, processes and systems for token evolutions with physical embodiments, and/or processes and systems for content co-creation mechanisms as described herein.

Figure 21:
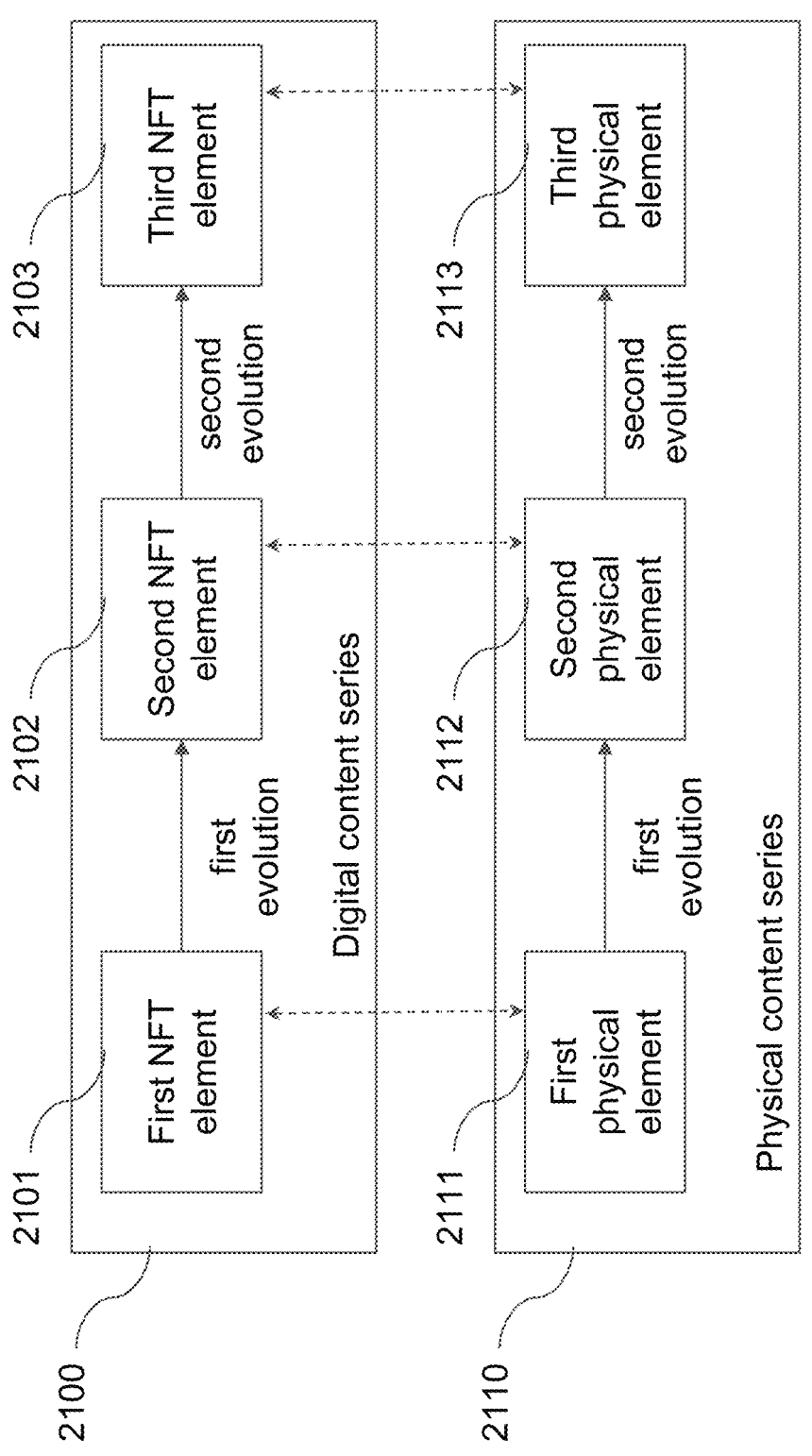
FIG. 21 conceptually illustrates a digital content series with a corresponding physical content series.

A digital content series can correspond with a physical content series in accordance with various embodiments of the invention. An example of a digital content series with a corresponding physical content series is conceptually illustrated in FIG. 21. A digital content series 2100 can correspond to a physical content series 2110. The digital content series 2100 can include a series of elements. The series of elements can include a first NFT element 2101 such as NFT, a second NFT element 2102, and a third NFT element 2103. Second NFT element 2102 can be made accessible to a party with access rights to first NFT element 2101. Accessibility of NFT elements can be based on and/or modified in response to evolution steps. Evolution steps can be initiated users. In several embodiments, evolution can be initiated by entities with access to one or more private keys associated a digital content series (e.g., an artist, a content creator). In some embodiments, evolutions can be initiated in response to measurements made by wallets used to store first NFT elements (e.g., first NFT element 2101). In several embodiments, measurements can include signals. Signals can include information related to other wallet contents and/or user actions. In a similar way, the second NFT element 2102 can evolve into the third NFT element 2103. In accordance with embodiments of the invention, when a first content element (e.g., a first NFT element) evolves into second content element (e.g., a second NFT element) the second content element 2102, it may be replaced by second NFT element 2102, or second NFT element 2102 may be added to the wallet comprising first NFT element 2101. In various embodiments, as an element of a digital content series evolves, this can also initiate the evolution of a corresponding element of physical content series 2110.

Figure 20:
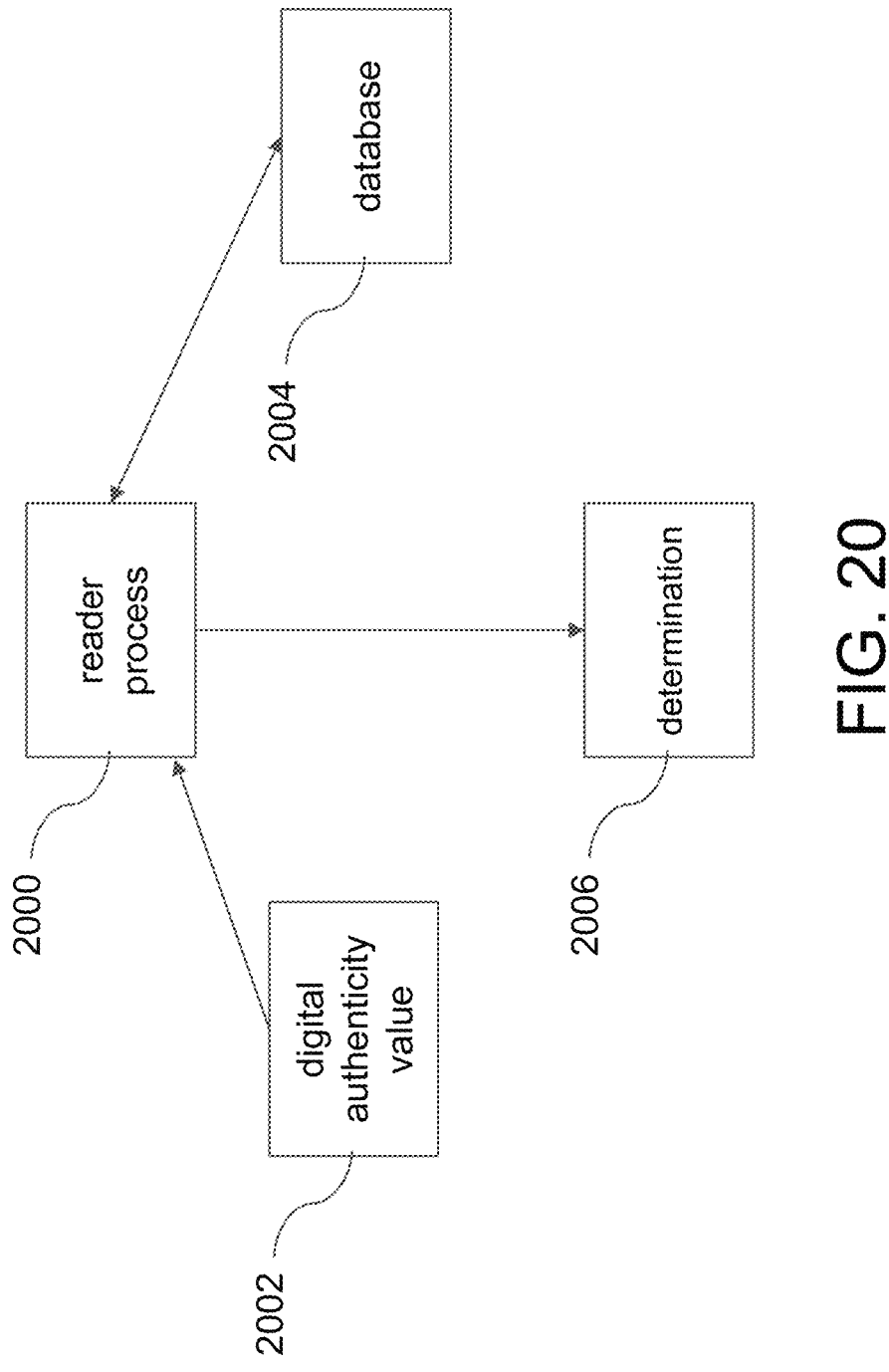
FIG. 20 conceptually illustrates a process that can access a digital authenticity value.

A first physical element 2111 corresponds to the first NFT element 2101. When the first NFT element 2101 evolves into second NFT element 2102, this can initiate an evolution that enables access based on the second NFT element 2102. The enabled access can be enabled access to a second physical element 2112. In some embodiments, accessing a second physical state can require that an owner of a first physical element send the first physical element to a party verifying the validity of first physical element (e.g., an example process for which is depicted in FIG. 20). In several embodiments, after a successful verification is performed, the second physical element 2112 can be provided to the owner of second NFT element 2102. In various embodiments, physical elements (e.g., first, second, and or third physical element) can be verified as authentic as described elsewhere herein (e.g., FIG. 20).

In some embodiments, a second physical element can be a modification (e.g., by the content creator) of first physical element. In accordance with embodiments of the invention, the now-modified second physical element can be verified using the same embedded digital authenticity value as first physical element was. In several embodiments, the updated verification means can be implemented by an update of a database by the content creator (e.g., an entity controlling a public key). The database update can indicate a modification of a first physical element to a second physical element, can indicate potential authentications of such information. In several embodiments, a potential authenticator is a digital signature associated with the content creator, and/or associated digital certificates.

In some embodiments, content (e.g., content associated with tokens) can evolve through a series of instances of a digital content element (e.g., five images of a mouse). In accordance with embodiments of the invention, the first image can be an image of a first status (e.g., the mouse being alive); the second image can be an image of a second status (e.g., the mouse eating poison); the third image can be an image of a third status (e.g., the mouse not feeling well); the fourth image can be an image of a fourth status (e.g., the mouse, dead). The fifth image can be an image of a fifth status (e.g., a decaying mouse). In certain embodiments, each image can be of anything, and need not be sequentially or otherwise related. In several embodiments, each one of the digital images can have multiple numbered copies (e.g., similar to a lithograph), and each such version can have a serial number associated with it, and/or a digital signature authenticating its validity. Digital signatures, in many embodiments, can associate a corresponding image to an identity (e.g., an identity of a content creator). In accordance with numerous embodiments of the invention, the evolution of the digital content can correspond to the transition from one representation (e.g., an image of the mouse, being alive) to another representation (e.g., of the mouse eating poison). In a number of embodiments, evolution can be triggered by a creator entity that created the token, by an event associated with the owner of the token, and/or by an external event measured by a platform associated with the content. In some embodiments, the platform is a wallet storing non-fungible tokens (NFTs).

In accordance with many embodiments of the invention, a series of digital representations can correspond to a series of physical representations. The physical representations can be physical and numbered images that are identical to the digital representations they are associated with. In some embodiments, physical representations can be of various type (e.g., statues, figures, etc). In several embodiments, associated digital representations can be drawings. In certain embodiments, physical embodiments can be of different aspects that relate to the digital series. For example, the physical representation can be of a cat and its reaction if it were to eat the mouse in the digital series. For example, a cat eating the live mouse may act playfully. This could be represented in a physical artwork of a cat playing with its prey. A cat eating a mouse that just had eaten poison may reach in a manner that indicates concern, and this is how the physical representation of the cat would be made. A cat eating a mouse that is not feeling well may be unaware of the distress of the mouse, which is what the third physical artwork may represent. A cat would be unlikely to eat a dead mouse, but instead just sniff at it. That may be what the fourth physical painting would illustrate. The fifth physical painting may show a cat that is backing off, as a cat may not want to approach a decaying mouse. In many embodiments, a digital series of images can be represented in the physical world, and the two could have numbered items, and there would be a correspondence between the two numbered items.

While specific processes and/or systems for a digital content series with a corresponding physical content series are described above, any of a variety of processes and/or systems can be utilized for accessing a digital content series with a corresponding physical content series as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to a digital content series with a corresponding physical content series, the techniques disclosed herein may be used in any type of cryptographic system. The techniques disclosed herein may be used within any of the rich media systems, permissioned blockchains, distributed ledgers, processes and systems for token evolutions with physical embodiments, and/or processes and systems for content co-creation mechanisms as described herein.

Figure 22:
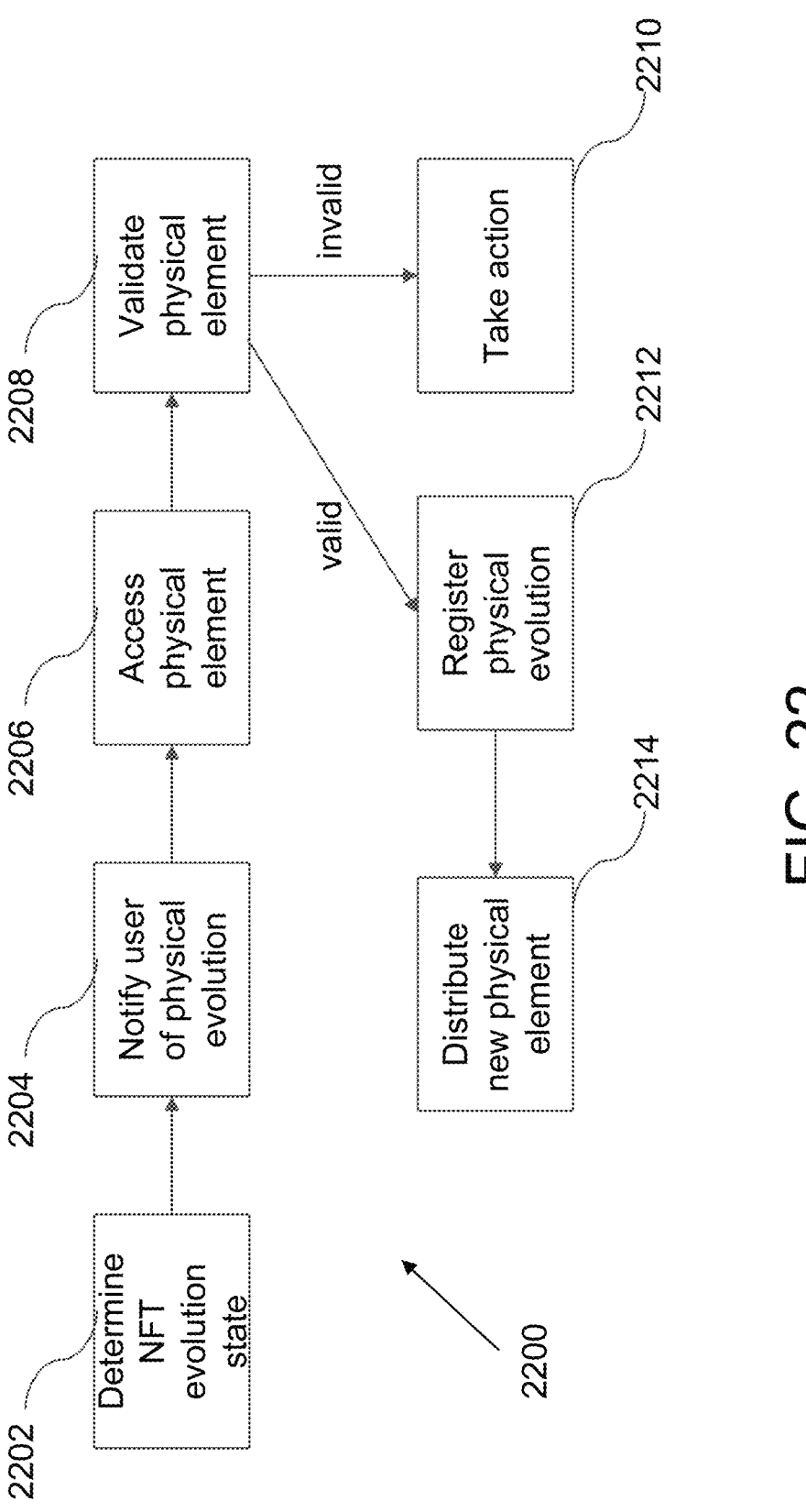
FIG. 22 conceptually illustrates a process for performing an evolution.

In various embodiments, processes can perform an evolution. In some embodiments, processes for performing evolutions can be performed (at least in part) by the content creator (entities with sufficient access rights), and/or by execution environments storing the NFT. In certain embodiments, an execution environment may include a wallet application that is run in a TEE. A process for performing an evolution is conceptually illustrated in FIG. 22. A process 2200 can determine (2202) the evolution state of an NFT. An evolution state of an NFT can be determined based on data stored in a database (e.g., a blockchain). In certain embodiments, the evolution state can be denoted by levels, and/or other labels. The process 2200 can notify (2204) a user of a pending physical evolution. In several embodiments, the notified user can correspond to an owner (e.g., an entity with owner access rights) of the NFT. In accordance with embodiments of the invention, the notification can be performed based on an ownership registry containing the contact information of owners and/or their representatives. The ownership registry can be operated by the content producer (e.g., an entity with content producer access rights). In a number of embodiments, notifications can be performed by an execution environment (e.g., wallet) in which the NFT is stored and/or used. The process 2200 can access (2206) the physical element. Several embodiments that include accessing the physical element are described elsewhere herein (e.g., FIG. 20). The process 2200 can validate (2208) the physical element. Physical element validation can be performed by expert-scrutiny to determine its authenticity, and/or it can be performed using techniques described elsewhere herein (e.g., FIG. 20). When the physical element is found not to be valid, the process 2200 can proceed to 2210. The processor 2200 can take (2210) an action based on a physical element being found not to be valid. In many embodiments, taking an action can include ignoring the receipt of the physical element. In accordance with embodiments of the invention, taking an action can include causing an associated NFT to not to be able to evolve anymore (e.g., by updating a database that is consulted during the evolution process). In several embodiments, updates can indicate that the NFT is blocked from evolving. In numerous embodiments, other actions can also be taken, as will be understood by a person of skill in the art. When the physical element is found to be valid, the process 2200 can proceed to 2212. The process 2200 can register (2212) the progress of the physical evolution (e.g., in database, in a blockchain). The process 2200 can distribute (2214) the new and/or modified physical element.

In some embodiments, an entity acquiring an NFT and/or other content container representing digital content, the entity can also be provided with the corresponding physical representation (e.g., artwork), and/or the rights to the physical representation. When a piece of digital content evolves it can change its digital representation in some embodiments. In certain embodiments, a digital content evolution can cause a signaling to a possessing entity to identify that the entity has a right to acquire a physical representation corresponding to the new state (e.g., evolved state) of the digital content. In an example, a user that buys the live mouse artwork, as an NFT, may receive a corresponding cat painting, or the rights to it. In various embodiments, the fact that there is a physical representation of a digital representation (e.g., NFT) may not be disclosed to a buyer of the digital representation. In many embodiments, signaling can indicate that the NFT owner has the right to a corresponding physical artwork, which can either be kept by the artist or sent to the NFT owner.

In accordance with a number of embodiments of the invention, a condition for receiving the physical representation corresponding to a new NFT (e.g., an evolved NFT) can be for the NFT owner to surrender a physical representation corresponding to the previous NFT state. In a number of embodiments, NFT owners can transmit the old physical representation to the content creator, who can then verify its authenticity, and/or destroy it. In response to receiving the physical representation, the content creator can transmit a new physical representation (e.g., the evolved physical representation corresponding to the evolve digital representation) to the owner. In various embodiments, when an NFT owner does not send in an old artwork, and/or when the owner sends in a fake, then the state of the corresponding NFT may halt (e.g., never again evolve), and/or the corresponding NFT can self-destruct. NFT self-destruction can include having a certificate associated with the value stored by the chip and/or communicated by the RFID transmitted (or represented and/or conveyed in another way) no longer be accepted (e.g., by placing the certificate on a certificate revocation list (CRL), as will be understood by a person of skill in the art.

In an example, a person who owns a digital representation that is in one of the stages of evolution, and a physical embodiment of an artwork that corresponds to that same NFT may wish to replace the physical artwork when the digital representation evolves. However, the person may also realize that other owners of digital representations corresponding to the same digital artwork may all replace their physical artworks, thereby making the older version more valuable. In some embodiments, digital representation owners can decide to not send in unevolved physical representations for a replacement, and instead keep it. In several embodiments, when a physical representation is not evolved, the owner can forfeit the chance of owning the new physical representation. In certain embodiments, an owner can optionally enter a transaction to enable ownership of both physical representations. In numerous embodiments, content creators can set configuration parameters related to the co-evolution that halts the evolution for any digital representation (e.g., NFT) for which the associated physical representation (e.g., artwork has not been updated). In many embodiments, content creators can associate another logic with evolutions of digital representations such that the digital representation for which the owner no longer has a corresponding updated physical representation artwork can react in another way (e.g., evolve slower, change color, only evolve if an action is taken by the digital representation owner, and/or other differences).

In some embodiments, the inclusion of a validator value is beneficial where a correspondence must be possible to be verified. This correspondence may be between a physical representation (e.g., an artwork) and a digital representation (e.g., an NFT), by two or more physical representations and/or other physical elements. Verification of validators can be performed in accordance with some embodiments of the invention by verifying digital signatures, their associated digital certificates, and/or, verifying that the digital certificates are not on CRLs.

In some embodiments, digital representations (e.g., NFTs) can use methods for evolution where the digital representations are associated with a state that has been defined a priori by a content creator. In accordance with embodiments of the invention, the state can indicate an extent of evolution. In several embodiments, the state can be changed based on a signal received from the content creator, based on a locally observed measurement relative to the content owner, based on a trusted beacon, and/or a combination of such methods. Local measurements can include lists indicating ownership associated with a wallet or other applications associated with the user owning or using tokens. In various embodiments, there can be one, two, three, four, five, or another number of pre-defined stages of evolution for a digital representation. In various embodiments, stages of evolution for a corresponding series of physical elements (e.g., representations) can include a number (e.g., an equal number, a different number) of elements, and the stages of evolution for the physical items can (though they need not be) be associated with the stages of evolution for the associated digital representations. In certain embodiments, there may be fewer or more stages of evolution for the physical representations than for the digital representations. Triggers for evolving a digital representation can be different from triggers for evolving a related physical representation.

It is note that throughout this document, representations and elements are used interchangeably.

In several embodiments, there also can be a series of physical representations which correspond to one, two, or another number of series of digital representations. In some embodiments, evolution of a physical representation can depend on the evolution of the NFTs of two or more series. The ownership of digital representations such as NFTs can be independent of the ownership of physical representations in accordance with numerous embodiments of the invention,. In some embodiments, independent databases (e.g., blockchains) registering ownership for each of physical representations and digital representations. Databases can indicate contact information, for example, of owners. In a number of embodiments, registries, which may be part of a database accessed to verify validity of digital representations and physical representations, may be used to establish a mapping between physical elements and ownership, in order to make counterfeits not possible to get away with.

In accordance with several embodiments of the invention, evolution of a digital representation (e.g., an NFT), can be performed based on methods such as disclosed in co-pending application titled "Content Evolution Techniques" by Markus Jakobsson which is hereby incorporated by reference. In several embodiments, content description can be determined, during evolution, based on two or more inputs. In various embodiments, inputs that can be used are content data from tokens, event descriptions, random signals, and/or other inputs more. In accordance with many embodiments of the invention, outputs are content data, the content data having been evolved (e.g., modified, modified in a pre-determined way). In some embodiments, an evolution outcome may not have been a priori predictable in completeness by a content creator. In numerous embodiments, content creators only specify a set of rules and principles for evolution and may not pre-specify in completeness each evolutionary stage. Such evolution methods are also compatible with the instant invention, as they can be used to influence modifications of physical elements undergoing evolution. In some embodiments, a physical representation corresponding to a digital representation can be modified, as part of evolution, based on the recent modifications performed to the digital representation as the digital representation underwent evolution. In a number of embodiments, information about digital representation states, including content data and other information associated with a token such as an NFT, can be conveyed to a content creator in charge of modifying a physical element, and can be optionally received in response to interaction with the physical element as described elsewhere herein.

In some embodiments, a content creator of a digital or physical representation can correspond to one or more individuals, corporations, and/or other entities (e.g., machines). In some embodiments, content creators can include artificial intelligence (AI) and/or other automated computational elements that are responsible for making at least some of the actions disclosed herein. In various embodiments, Al can generate updates of physical elements corresponding to evolutionary changes.

In numerous embodiments, the determination that an element should evolve, whether the element is digital or physical, can be performed based on an action of a content creator or associated party, and/or be determined by a client-side application. Client-side applications can include wallets. Client-side applications can be run in trusted execution environments (TEEs). In some embodiments, determinations can be performed by a separate entity. Separate entities can be distributed in certain embodiments. Distributed separate entities can include multiple participants, where their collective actions are determined based on a consensus mechanism. An example of such participants is a collection of miners implementing a functionality related to evolution in a distributed manner. The software governing the implementation of this functionality may be updated based on consensus mechanisms, as disclosed in U.S. Provisional Patent Application No. 63/232,728 filed Aug. 13, 2021 titled "Secure and Intelligent Decentralized Technology" and U.S. patent application Ser. No. 17/810,085 filed Jun. 30, 2022 titled "Distributed Ledgers with Ledger Entries Containing Redactable Payloads", which are hereby incorporated by reference.

In numerous embodiments, digital representations are associated with physical representations. Association can be related to ownership, but can also be independent of it. In accordance with some embodiments of the invention, validity of one of the elements, such as the physical element, can be governed by conditions related to an item with which it is associated (e.g., one or more NFTs). For example, a physical painting of a litter of cats may have a digital authenticity value that indicates the provenance of the painting (e.g., attests to the identity of the content creator associated with the physical painting).

In some embodiments, digital authenticity values can be conditional on the state of one or more associated NFTs. For example, a digital authenticity value can correspond to four NFTs, each one of a kitten portrayed in the physical painting. Each one of these NFTs may have a state that depends on the context where it is kept (e.g., whether the kitten NFT is fed mouse NFTs). Continuing the example, if a kitten NFT is not fed mouse NFTs with a predetermined frequency, the kitten may starve, and the associated NFT may be invalidated to indicate the death of the kitten. The state change of the kitten NFT can impact the state of the associated physical painting. For example, the death of one of the associated kittens may trigger an evolution event in which the painting is replaced with a version in which the now-dead kitten is removed, or its depiction is modified to indicate that it is diseased. The condition failure (e.g., failing to feed the kitten NFT with mouse NFTs) can also cause the invalidation of the digital authenticity value associated with the physical painting.

In some embodiments, relationships can also be expressed between two or more physical elements. In various embodiments, the logics associated with two or more associated elements, whether digital and/or physical, may be expressed by one or more rules or policies. In several embodiments, rules or policies can be publicly known or a priori secret to anybody except a creator of the rules or policies, which may be the content creator.

While specific processes and/or systems for performing an evolution are described above, any of a variety of processes and/or systems can be utilized for performing an evolution as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to performing an evolution, the techniques disclosed herein may be used in any type of cryptographic system. The techniques disclosed herein may be used within any of the rich media systems, permissioned blockchains, distributed ledgers, processes and systems for token evolutions with physical embodiments, and/or processes and systems for content co-creation mechanisms as described herein.

Content Co-creation Mechanism

Figure 23:
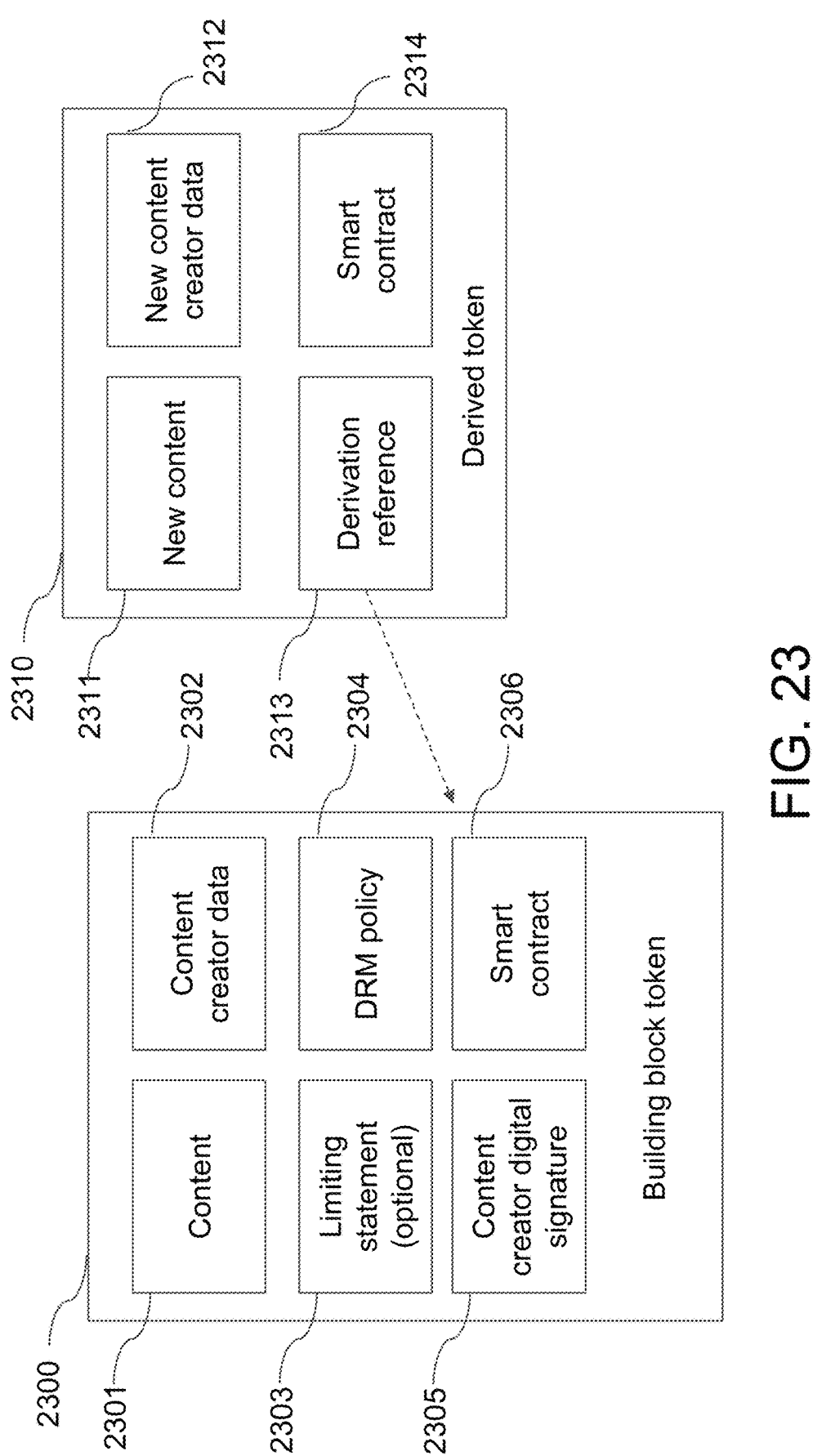
FIG. 23 conceptually illustrates a derived token.

Content can be co-created to generate derived tokens in some embodiments. An example of a derived token is conceptually illustrated in FIG. 23. A building block token 2300 can be created by a first content creator. The building block token 2300 can then be acquired by or granted access to for a second content creator. The building block token 2300 can include content 2301 (e.g., audio, image, etc). In certain embodiments, tokens (e.g., building block tokens and/or derived tokens) can include provenance data and/or token information as discussed herein. The building block token 2300 can include content creator data 2302. In certain embodiments, content creator data can include references to social media profile, public key associated with the first content creator, wallet addresses and/or other content creator data. The building block token 2300 can optionally include a limiting statement 2303. In many embodiments, limiting statements can specify how many more tokens like building block token 2300 can be issued by the first content creator for a specified time period, and/or conditions under which additional building block tokens can be generated by the first content creator. The building block token 2300 can include a DRM policy 2304. In accordance with embodiments of the invention, DRM policies can specify how many derived tokens (e.g., such as derived token 2310) can be generated from building block token 2300, and/or other conditions related to the use of building block token 2300 and/or derived tokens. Conditions can include such as how these tokens can be rendered, sold, rented out, and/or other conditions. Building block token 2300 can include a content creator digital signature 2305. Content digital signature 2305 can be a digital signature on content 2301, content creator data 2302, optional limiting statement 2303 and/or DRM policy 2304. The building block token 2300 can include a smart contract 2306. In some embodiments, smart contracts can specify a royalty structure for the building block token. including how various entities are rewarded for their actions Smart contracts can specify a royalty structure as disclosed in U.S. Provisional Patent Application No. 63/281,721 filed Nov. 21, 2021 titled "Royalty Sharing Method" and U.S. patent application Ser. No. 17/935,541 filed Sep. 26, 2022 titled "Systems and Methods for Transaction Management in NFT-Directed Environments", the disclosures of which are hereby incorporated by reference. A derived token 2310 can include new or modified content 2311 that is selected by the second content creator. In some embodiments, the new/modified content can also specify how content from a building block token and the new elements of content can be combined. The derived token 2310 can include second content creator data 2312. The second content creator data can include reference to a social media profile, a statement by a second content creator (e.g., "Thank you Alice for being so awesome"), a public key associated with the second content creator, and/or other information. Derived token 2310 can include a derivation reference 2313 that is an indication of what token(s) the derived token is generated from. The derivation reference 2313 can refer to the building block token 2300. Derived token 2310 can include a smart contract 2314. In some embodiments, smart contracts can add rules to smart contract 2306 further restricting the use of the derived token 2310, which as it is being used also causes a use of content 2301 and other elements associated with building block token 2300.

While specific processes and/or systems for derived tokens are described above, any of a variety of processes and/or systems can be utilized for derived tokens as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to derived tokens, the techniques disclosed herein may be used in any type of cryptographic system. The techniques disclosed herein may be used within any of the rich media systems, permissioned blockchains, distributed ledgers, processes and systems for token evolutions with physical embodiments, and/or processes and systems for content co-creation mechanisms as described herein.

Figure 24:
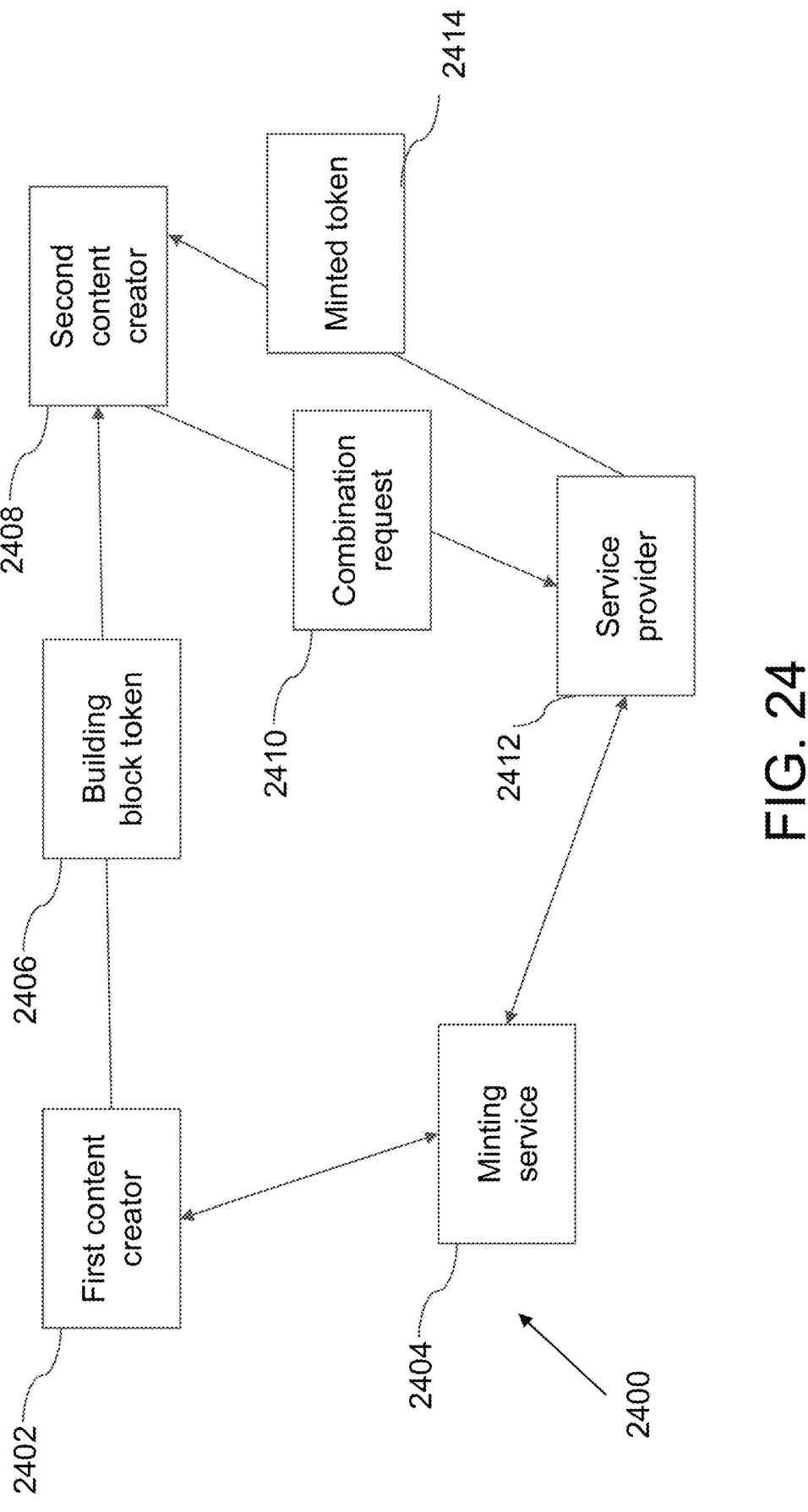
FIG. 24 conceptually illustrates a system for creating combined content tokens.

In accordance with embodiments of the invention, combined token content can be generated by systems. An example system for creating combined content tokens is conceptually illustrated in FIG. 24. A system 2400 can include a first content creator 2402. In some embodiments, content creators can obtain, select, and/or generate token information. In various embodiments, token information can include content, content creator data, limiting statements, DRM policies, and/or content creator digital signatures. The system 2400 can include a minting service 2404. The first content creator can transmit token information to the minting service 2404. The minting service can mint a building block token 2406 based on the token information. The first content creator 2402 can cause the building block token 2406 to be transferred to second content creator 2408. The Second content creator 2408 can generate second token information. The second creator 2408 can transmit a combination request 2410. In various embodiments, combination requests can include token information, references to building block tokens (e.g., building block token 2406), and/or other data (e.g., new content, new content creator data, optional other data). The second content creator 2408 can transmit (e.g., broadcast) the combination request 2410. The combination request 2410 can be received by service provider 2412. In accordance with embodiments of the invention, service providers can verify that tokens are allowed to be minted (e.g., based on DRM policy and/or data recorded on blockchains). When the service provider 2412 determines that a token can be minted, then it can interact with minting service 2404 that mints a token 2414. In various embodiments minted tokens can correspond to derived tokens and/or to new tokens. In many embodiments, minted tokens can be generated based on integration of data from building block tokens and combination requests. The minted token 2414 can be provided to the second content creator. In some embodiments, combination requests can include an assignments of building block tokens to service providers.

Users can acquire non-fungible tokens (NFTs) including content portions (e.g., audio files, video files, etc.) and/or provenance statements in accordance with numerous embodiments of the invention. In some embodiments, provenance statements can include identification of the content creator associated with the content portion. Tokens including content and provenance statements can be referred to as building block tokens. Building block tokens can be used for the generation of derived works. In various embodiments, derived works can integrate the content portion of building block tokens (or portions or versions thereof), and/or can include the provenance statement associated with the building block tokens. In some embodiments, derivative tokens can include content based on one or more building block tokens, and original content. In certain embodiments, original content can be tokenized into building block tokens.

In accordance with many embodiments of the invention, entities (processes, machines, users, etc.) that have acquired and/or generated building block tokens can combine the content of building block tokens with each other. In some embodiments, building block tokens content can also be combined with new content provided by an entity. An entity which combines content from building blocks with each other and/or with new content can be referred to as a derived work creator. In various embodiments, derived work creators can be entities which generated derived works. In some embodiments, derived works are those resultant content which is generated based on a combination of content from one or more building block tokens with other content (e.g., new content, content from a different one or more building block tokens). In many embodiments, derived tokens can be tokens which are associated with content that includes derived works. In a number of embodiments, derived tokens can include content elements from all the building block tokens used, additional content, and/or instruction data that identifies how these various elements can be combined (e.g., spliced together, overlaid, stretched, cut, or otherwise distorted or modified). In some embodiments, derived tokens can include provenance statements. Provenance statements can refer to and/or incorporate provenance statements of related (e.g., those building block tokens used in the creation of the derived token) building block tokens. In accordance with several embodiments of the invention, entities can combine the entities content with the content of a second entity. In various embodiments, derived tokens and/or building block tokens can be represented as NFTs.

In some embodiments, the minting of a new token (e.g., a building block token, and/or a derived token), and its associated provenance statement may only be valid when the associated provenance statement was created by an entity user with access rights to the building blocks. In certain embodiments, access rights can be conferred to entities by the transfer of ownership of associated tokens (e.g., NFTs). In a number of embodiments, users can create valid derived token only when including the described provenance statement for content that the entity has the right to use. In certain embodiments, the right to use can be expressed by the acquisition of the associated building block tokens.

In some embodiments, NFTs (e.g., derived tokens and/or building block tokens) can express content and provenance, as described elsewhere herein. In several embodiments, NFTs can enable the further derivations of work from it, thereby allowing the derived work creator to assert co-creatorship of the derived token, along with the creators associated with the building block tokens. In certain embodiments, writing the NFTs to an immutable ledger allows for holders of a building block token created by a first entity to be able to demonstrate having created a derived work together with the first entity.

In accordance with numerous embodiments of the invention, when tokens (e.g., derived tokens) are minted, two principal versions can be generated. A first principal version can enable the rendering of associated content and provenance determination. In some embodiments, rendering of the content can include playing of music, displaying of video, etc. Provenance determinations can refer to processes for evaluating the provenance of a token associated with content in some embodiments. A second principal version can enable the token to be used as a building block token. In various embodiments, building block tokens include additional capabilities not associated with other tokens. In accordance with numerous embodiments of the invention, building block tokens confer the capability to create derived works with shared co-creatorship.

In several embodiments, building block tokens are associated with policies that specify terms under which derived works can be generated. In accordance with various embodiments of the invention, terms can include the right to mint a token with recognized co-creatorship as described elsewhere herein. In some embodiments, terms can limit a number of different derived tokens that can be generated from associated building block tokens (e.g., just one, no more than five, or up to 1800). In several embodiments, terms can specify how many copies of each related derived token can be generated (e.g., a pre-specified threshold number, an unlimited number). In numerous embodiments, terms can specify a royalty structure of any derived token (e.g., the portion of the sales that will be provided as royalty to the creator of each building block token, whether expressed as a percentage, as a specified amount such as $0.05). In various embodiments, a first royalty can be specified for all sales and a second royalty can be specified for other uses (e.g., such as renting). In some embodiments, building block tokens can specify whether derived works can also be used as building blocks, or not. In various embodiments, building block tokens can specify the length of the chain, each iterative derived work being a new link, that the building block token can be used for.

In an example, a user, Alice, buys from Bob an NFT that is a building block token. The NFT corresponds to a piano solo by famous artist Cindy. Alice's husband Dave has always wanted to record a song with Cindy. Alice gifts the NFT to Dave. Dave listens to Cindy's piano solo and creates three versions of lyrics, and three versions of drum accompaniment, combining these with the piano solo to create a total of nine different versions. He does not like four of these. Dave shares the remaining five combinations with friends, who help narrow it down to two versions. Dave places those on Amazon Mechanical Turk and requests workers to provide votes of how much they like each version. Dave selects the winner version and has an NFT generated from it by sending it to a service associated with Cindy, where this service generates the NFT and sends it back after receiving the NFT Alice bought from Bob and causes this to be destroyed. The minted NFT not only contains the content, co-produced by Dave and Cindy, but also a digital signature attesting to the authenticity of the song, created by the service on behalf of Cindy, and using Cindy's digital signature. Dave receives the newly minted NFT, to replace the building block token he received as a gift from Alice, and proudly places the minted NFT as a badge for his social media profile. Anybody clicking on the badge can determine that this is a valid NFT, and that it contains a digital signature that is verified using Cindy's public key. It also contains information about the song, e.g., data about when Cindy recorded her clip, when Dave recorded his part, a profile associated with Cindy and a profile associated with Dave, both comprising references to their social media accounts. The viewers can play the song, as Dave has provided that right, but they cannot play it in public, as this is not allowed by the digital rights management (DRM) policy included in the NFT, as the NFT Alice bought from Bob did not enable this. If Dave wants to, he can pay an additional fee to Cindy to have the NFT updated so that the collaborative work is allowed to be played in public, e.g., on the radio.

In some embodiments, upgrade processes can be performed similar to how the gifted NFTs and combined content was received by the service provider and a minted NFT returned in response to it. In several embodiments, upgrade processes can include a minting service provider receiving a previously minted NFT along with a derived work. In numerous embodiments, the process can further determine that a payment was received. Based on the previously minted NFT, and the payment receipt, a process can generate a new NFT. In accordance with several embodiments of the invention, the new NFT can have with rights to play in public. The process can destroy the received previously minted NFT. Methods to destroy NFTs are disclosed in U.S. Provisional Patent Application No. 63/277, 472 filed Nov. 9, 2021 titled "Green Proof of Stake" by Markus Jakobsson, which is hereby incorporated by reference.

NFTs can include smart contracts that allow minting of a derived token by an entity owning a derived token in which a reference is made to a first NFT (e.g., building block token), in several embodiments. Derived tokens can contain and/or reference content generated by a creator of the first NFT, DRM policies, and/or an NFT creator digital signature on the content and on the DRM policy. In several embodiments, derived tokens, can reference building block tokens, and can contain and/or reference new content added by a derived token creator. This new content can include content files (e.g., sound files), a derived token creator's public key, a reference to the derived token creator's social media handle, etc. In many embodiments, when derived tokens are minted, a smart contract of a building block token can be executed, and a determination can be made. In accordance with embodiments of the invention, the determination can include determining that less than a threshold (e.g., 1, 2, 3, or another number) number of previous derived token have been minted based on the building block token. In some embodiments, when the smart contract allows multiple mintings to be performed, or includes other limitations or policies, then these can be verified. In some embodiments, verifications can be made relative to data recorded on blockchains (e.g., be dependent on publicly observable events). In several embodiments, verifications can be made relative to encrypted data. In certain embodiments, verifications can be relative to private states maintained by service providers indicated by the smart contract.

In various embodiments, minting of new NFTs can be conditional on the evaluation of smart contracts. Bounty hunters can identify breaches of the smart contract and can report the breach. In many embodiments, in response to bounty hunter identification, identified NFT can be identified as invalid. Identification of invalidity can cause a penalty to be applied to the entity performing the minting. An example policy may relate to the forfeiture of an asset that the minter has staked.

In certain embodiments, the contents of a building block token can be integrated with the content provided by a creator to generate derived content. The derived content can be used as input to create a derived token. Derived token content can include content files, smart contracts, policies, references to the creators' social media accounts, digital signatures attesting to the validity of the content, etc. When the policies governing the minting of new tokens (e.g., NFTs) of the building block tokens limit the number of actions (e.g., mintings) that can be performed, the validity of the NFT that Alice bought from Bob depends on how many such actions have been taken. In several embodiments, when an NFT is transferred, policies have to be verified to establish that the NFT still can be used as expected. In accordance with numerous embodiments of the invention, In order to avoid race conditions between the minting of NFTs and the verification that no such minting has been performed, a brief escrow-based delay can be imposed on transaction, wherein the ownership is temporarily reassigned to the escrow authority, which may be distributed and operated using consensus mechanisms. The techniques described for this embodiment can also be combined with those described in the other embodiments disclosed herein.

In numerous embodiments, an element of the building block token comprises a limiting statement. A limiting statement can be in the form of a machine-readable policy, an executable element (e.g., a smart contract), a human-readable assertion, and/or another form of expression, as will be understood by a person of skill in the art. In some embodiments, limiting statements can include and/or be associated with a digital signature of the content creator and/or a trusted third party that audits the actions of the content creator. In several embodiments, limiting statements can express limitations such as "only ten NFTs will be issued in this series", "only 50 NFTs that are building block tokens will be issued by the creator this calendar year", "additional building block tokens may only be issued if <condition A> is satisfied", where <condition A> may represent an event that will be publicly verifiable (e.g., the Yankees win their next game, this token is resold for more than ETH 4, etc.). In a number of embodiments, limiting statements can be verified by a party minting NFTs. Limiting statements can be verified before an NFT is minted for a creator. Limiting statements can be verified by a marketplace, a wallet of a buyer, by a bounty hunter, and/or by other entities. Limiting statements can be created not only for building block tokens, but also for other tokens.

In various embodiments, building block tokens can be provided to an entity as a result of an evolution, spawning and/or peeling action. Evolution, spawning and peeling actions are disclosed in U.S. Provisional Patent Application No. 63/275,713 filed Nov. 4, 2021 titled "User-Specific Evolution, Spawning and Peeling" and U.S. patent application Ser. No. 17/929,894 filed Sep. 6, 2022 titled "Methods for Evolution of Tokenized Artwork, Content Evolution Techniques, Non-Fungible Token Peeling, User-Specific Evolution Spawning and Peeling, and Graphical User Interface for Complex Token Development and Simulation", which are hereby incorporated by reference. In numerous embodiments, building block tokens can be provided as gifts to users (e.g., as a result of winning a raffle, of having taken a triggering action, or due to a match with a template). In several embodiments, raffles can be performed among qualifying participants. Qualifying participants can include participants identified based on membership to organizations, ownership of a given type of NFT, and/or participants who qualify based on their past actions. Raffle winners can be determined using an unpredictable entropy source (e.g., the price of a publicly traded asset) as an input to a hash function and the output be used as a seed to a pseudo-random generator (PRG), or as a random value. Relevant methods for determining whom to gift a token to, and associated technology, are also disclosed in U.S. Provisional Patent Application No. 63/282,211 filed Nov. 23, 2021 titled "Automated Blockchain Based Recommendation Generation, Advertising and Promotion" and U.S. patent application Ser. No. 17/806,728 filed Jun. 13, 2022 titled "Systems and Methods for Encrypting and Controlling Access to Encrypted Data Based Upon Immutable Ledgers", which are hereby incorporated by reference.

While specific processes and/or systems for creating combined content tokens are described above, any of a variety of processes and/or systems can be utilized for creating combined content tokens as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to creating combined content tokens, the techniques disclosed herein may be used in any type of cryptographic system. The techniques disclosed herein may be used within any of the rich media systems, permissioned blockchains, distributed ledgers, processes and systems for token evolutions with physical embodiments, and/or processes and systems for content co-creation mechanisms as described herein.

Figure 25:
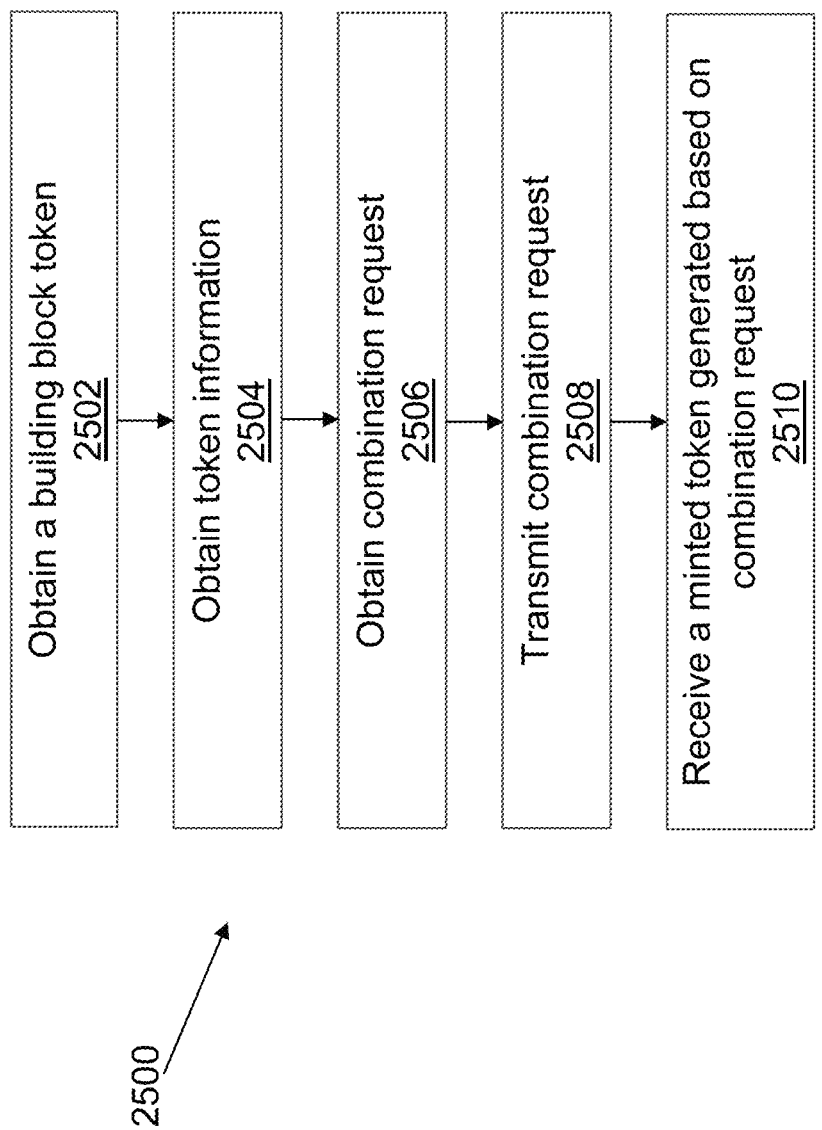
FIG. 25 conceptually illustrates a process for creating combined content tokens.

In accordance with embodiments of the invention, combined token content can be generated by processes. An example process for creating combined content tokens is conceptually illustrated in FIG. 25. A process 2500 can obtain (2502) a building block token. In several embodiments, and throughout this example associated with FIG. 25., obtained can refer to received, generated, and/or otherwise obtained. The process 2500 can obtain (2504) token information. Token information can include content, content creator data, limiting statements, DRM policies, content creator digital signatures, and/or other information. The process 2500 can obtain (2506) a combination request. In several embodiments, the combination request can refer to building block token. In certain embodiments, the combi- nation request can be transmitted using a blockchain trans- action. The process 2500 can transmit (2508) (e.g., broad- cast) the combination request. The process 2500 can receive (2510) a minted token generated based on the combination request. A minted token can be transmitted by a service provider in accordance with several embodiments of the invention.

While specific processes and/or systems creating com- bined content tokens are described above, any of a variety of processes and/or systems can be utilized for creating com- bined content tokens as appropriate to the requirements of specific applications. In certain embodiments, steps and/or components may be executed or performed in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are described in reference to creating combined content tokens, the tech- niques disclosed herein may be used in any type of crypto- graphic system. The techniques disclosed herein may be used within any of the rich media systems, permissioned blockchains, distributed ledgers, processes and systems for token evolutions with physical embodiments, and/or pro- cesses and systems for content co-creation mechanisms as described herein.

While the above description contains many specific embodiments of the invention, these should not be construed as limitations on the scope of the invention, but rather as an example of one embodiment thereof. Accordingly, the scope of the invention should be determined not by the embodi- ments illustrated, but by the appended claims and their equivalents.

What is claimed is:

1. A device configured to implement a distributed ledger, the distributed ledger capable of immutably recording derivative tokens, the device comprising:
   a memory, comprising processor instructions; and
   a processor, the processor configured to execute the processor instructions to:
   receive:
      a building block token, the building block token comprising an initial set of access rights to a first piece of content, a first reference to the first piece of content, and a reference to a wallet address associated with at least one content creator of the first piece of content; and
      a second piece of content;
   generate, in response to a determination received from the wallet address:
      a third piece of content, based on:
         the second piece of content; and
         access obtained to the first piece of content using the initial set of access rights; and
      a record to mint a derivative token based on the building block token, the record comprising:
         independent references to each of:
            the wallet address associated with the at least one content creator;

an additional set of access rights to the third piece of content, wherein the additional set of access rights is based on the initial set of access rights;
         the building block token;
         the second piece of content; and
         the third piece of content; and
      a second digital signature; and
   transmit the record, wherein:
      the record is configured to be incorporated into a ledger entry; and
      the ledger entry is capable of being used to compute a challenge for securely adding the ledger entry to a distributed ledger using a cryptographic system.

2. The device of claim 1, wherein the building block token is a non-fungible token.

3. The device of claim 1, wherein the derivative token references:
   a first identity value, associated with the first piece of content, used to generate a first digital signature, included in the building block token; and
   a second identity value, associated with the second piece of content, used to generate a second digital signature, included in the building block token.

4. The device of claim 1, wherein the first piece of content is associated with a type selected from a group consisting of an audio file, a video file and an image file.

5. The device of claim 1, wherein the record further comprises modification instructions for combining the first piece of content and the second piece of content.

6. The device of claim 1, wherein the building block token further comprises a digital rights management element used to generate the additional set of access rights.

7. The device of claim 1, wherein the determination received from the wallet address before the record to mint the derivative token is a royalty payment corresponding to the first piece of content.

8. The device of claim 1, wherein a creator digital signature associated with a first content creator is generated, at least in part, using the first piece of content.

9. A non-transitory computer-readable medium compris- ing instructions that, when executed, are configured to cause at least one processor to perform a method for implemen- tation of a distributed ledger, the method comprising:
   receiving:
      a building block token, the building block token com- prising an initial set of access rights to a first piece of content, a first reference to the first piece of content, and a reference to a wallet address associ- ated with at least one content creator of the first piece of content; and
      a second piece of content;
   generating, in response to a determination received from the wallet address:
      a third piece of content, based on:
         the second piece of content; and
         access obtained to the first piece of content using the initial set of access rights; and
      a record to mint a derivative token based on the building block token, the record comprising:
         independent references to each of:
            the wallet address associated with the at least one content creator;
            an additional set of access rights to the third piece of content, wherein the additional set of access rights is based on the initial set of access rights;
            the building block token;

the second piece of content; and the third piece of content; and a second digital signature; and transmitting the record, wherein:

the record is configured to be incorporated into a ledger entry; and the ledger entry is capable of being used to compute a challenge for securely adding the ledger entry to a distributed ledger using a cryptographic system.

10. The non-transitory computer-readable medium of claim 9, wherein the derivative token references:

a first identity value, associated with the first piece of content, used to generate a first digital signature, included in the building block token; and a second identity value, associated with the second piece of content, used to generate a second digital signature, included in the building block token.

11. The non-transitory computer-readable medium of claim 9, wherein the record further comprises modification instructions for combining the first piece of content and the second piece of content.

12. The non-transitory computer-readable medium of claim 9, wherein the determination received from the wallet address before the record to mint the derivative token is a royalty payment corresponding to the first piece of content.

13. The non-transitory computer-readable medium of claim 9, wherein the building block token further comprises a digital rights management element used to generate the additional set of access rights.

14. A method for implementation of a distributed ledger, the method comprising:

receiving:

a building block token, the building block token comprising an initial set of access rights to a first piece of content, a first reference to the first piece of content, and a reference to a wallet address associated with at least one content creator of the first piece of content; and a second piece of content;

generating, in response to a determination received from the wallet address:

a third piece of content, based on:

the second piece of content; and access obtained to the first piece of content using the initial set of access rights; and a record to mint a derivative token based on the building block token, the record comprising:

independent references to each of:

the wallet address associated with the at least one content creator;

an additional set of access rights to the third piece of content, wherein the additional set of access rights is based on the initial set of access rights;

the building block token;

the second piece of content; and the third piece of content; and a second digital signature; and transmitting the record, wherein:

the record is configured to be incorporated into a ledger entry; and the ledger entry is capable of being used to compute a challenge for securely adding the ledger entry to a distributed ledger using a cryptographic system.

15. The method of claim 14, wherein the building block token is a non-fungible token.

16. The method of claim 14, wherein the derivative token references:

a first identity value, associated with the first piece of content, used to generate a first digital signature, included in the building block token; and a second identity value, associated with the second piece of content, used to generate a second digital signature, included in the building block token.

17. The method of claim 14, wherein the first piece of content is associated with a type selected from a group consisting of an audio file, a video file and an image file.

18. The method of claim 14, wherein the record further comprises modification instructions for combining the first piece of content and the second piece of content.

19. The method of claim 14, wherein the building block token further comprises:

a digital rights management element used to generate the additional set of access rights.

20. The method of claim 14, wherein a creator digital signature associated with a first content creator is generated, at least in part, using the first piece of content.

* * * * *